United States Patent
Qi et al.

(10) Patent No.: US 11,743,949 B2
(45) Date of Patent: Aug. 29, 2023

(54) METHOD AND APPARATUS FOR RANDOM ACCESS IN AN INTEGRATED ACCESS AND BACKHAUL COMMUNICATION SYSTEM

(71) Applicant: Samsung Electronics Co., Ltd., Gyeonggi-do (KR)

(72) Inventors: Yinan Qi, Middlesex (GB); Seunghoon Choi, Middlesex (GB)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/264,068

(22) PCT Filed: Aug. 2, 2019

(86) PCT No.: PCT/KR2019/009680
§ 371 (c)(1),
(2) Date: Jan. 28, 2021

(87) PCT Pub. No.: WO2020/027626
PCT Pub. Date: Feb. 6, 2020

(65) Prior Publication Data
US 2021/0298088 A1    Sep. 23, 2021

(30) Foreign Application Priority Data

Aug. 3, 2018  (GB) ...................................... 1812678
Aug. 9, 2018  (GB) ...................................... 1812976

(51) Int. Cl.
*H04W 74/08*  (2009.01)
*H04W 88/14*  (2009.01)
*H04L 5/00*  (2006.01)

(52) U.S. Cl.
CPC ....... *H04W 74/0833* (2013.01); *H04L 5/0051* (2013.01); *H04W 88/14* (2013.01)

(58) Field of Classification Search
CPC combination set(s) only.
See application file for complete search history.

(56) References Cited

U.S. PATENT DOCUMENTS 9,407,350 B2   8/2016  Ohta et al.
10,136,359 B2  11/2018  Hampel et al.
(Continued)

FOREIGN PATENT DOCUMENTS

EP      2846490        3/2015
KR   1020180022699    3/2018
(Continued)

OTHER PUBLICATIONS

Motorola Mobility, Lenovo, "RACH Resource Configuration and Selection", R1-1714216, 3GPP TSG RAN WG1 Meeting #90, Aug. 21-25, 2017, 3 pages.
(Continued)

*Primary Examiner* — Yee F Lam
(74) *Attorney, Agent, or Firm* — The Farrell Law Firm, P.C.

(57) ABSTRACT

An integrated access and backhaul, IAB, wireless communication system comprises a first base station, a second base station, and a plurality of remote wireless communication units, wherein the second base station provides access to a core network, and the first base station requires access to the core network via the second base station. The second base station includes: a transceiver; and a processor, operably coupled to the transceiver and arranged to: configure a first random access channel, RACH, resource for use by the first base station; and configure a second random access channel, RACH, resource for use by the plurality of remote wireless communication units to access the second base station, wherein the configured second RACH is different to the configured first RACH. Also disclosed is Disclosed is a method of configuring a positioning reference signal in a telecommunication system comprising transmitting the positioning reference signal multiplexed with another signal.

15 Claims, 9 Drawing Sheets

(56) References Cited

U.S. PATENT DOCUMENTS

| | | | |
|---|---|---|---|
| 2013/0051307 A1 | 2/2013 | Fan | |
| 2018/0192412 A1 | 7/2018 | Novlan et al. | |
| 2019/0312619 A1* | 10/2019 | Abedini | H04B 17/382 |
| 2019/0342904 A1* | 11/2019 | Islam | H04B 7/15507 |
| 2020/0015274 A1* | 1/2020 | Islam | H04L 27/2607 |
| 2020/0107362 A1* | 4/2020 | Qi | H04W 52/322 |
| 2020/0146076 A1* | 5/2020 | Islam | H04B 7/155 |

FOREIGN PATENT DOCUMENTS

| | | |
|---|---|---|
| WO | WO 2012/020503 | 2/2012 |
| WO | WO2018031170 | 2/2018 |
| WO | WO2018063892 | 4/2018 |
| WO | WO2018226365 | 12/2018 |
| WO | WO 2019/216993 | 11/2019 |

OTHER PUBLICATIONS

European Search Report dated Aug. 5, 2021 issued in counterpart application No. 19844727.8-1215, 8 pages.
PCT/ISA/210 Search Report issued on PCT/KR2019/009680, dated Nov. 26, 2019, pp. 3.
PCT/ISA/237 Written Opinion issued on PCT/KR2019/009680, dated Nov. 26, 2019, pp. 6.
Search Report issued on Great Britain Application No. GB1812976.7, dated Feb. 11, 2019, pp. 8.
AT&T, 3GPP TSG RAN WG1 Meeting #93, R1-1807769, Busan, Korea, May 24, 2018, "Summary of 7.7.1 Enhancements to support NR backhaul links", pp. 22.
Qualcomm Incorporated, 3GPP TSG RAN WG1 Meeting #93, R1-1807393, Busan, Korea, May 12, 2018, "Enhancements to support NR backhaul links", pp. 17.
Samsung, 3GPP TSG RAN WG1 Meeting #93, R1-1806765, Busan, Korean, May 11, 2018, "Necessary Enhancements for NR IAB", pp. 6.
LG Electronics, "Discussions on NR IAB Support", R1-1806649, 3GPP TSG RAN WG1 Meeting #93, May 21-25, 2018, 12 pages.
Japanese Office Action dated Feb. 21, 2022 issued in counterpart application No. 2021-528320, 10 pages.
European Search Report dated Mar. 21, 2023 issued in counterpart application No. 19844727.8-1215, 6 pages.

* cited by examiner

[Fig. 1]
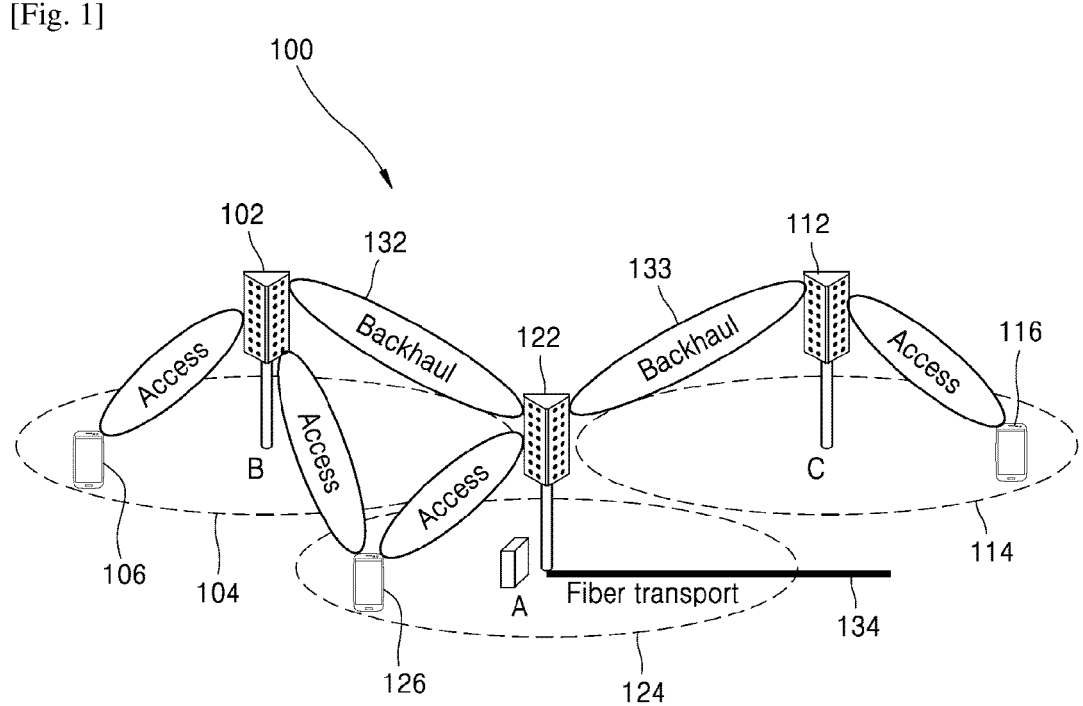
[Fig. 2]
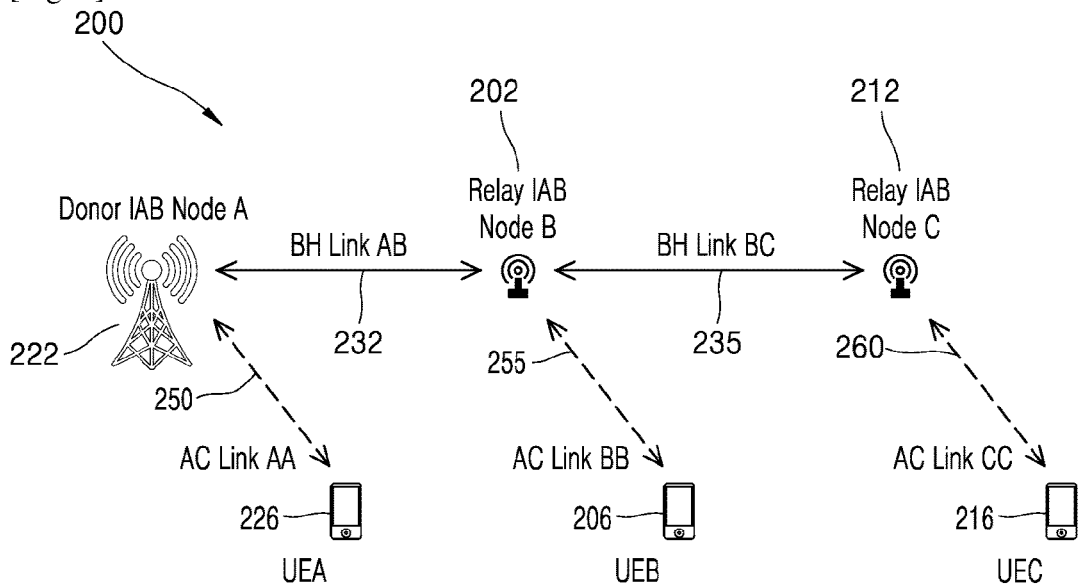

[Fig. 3]
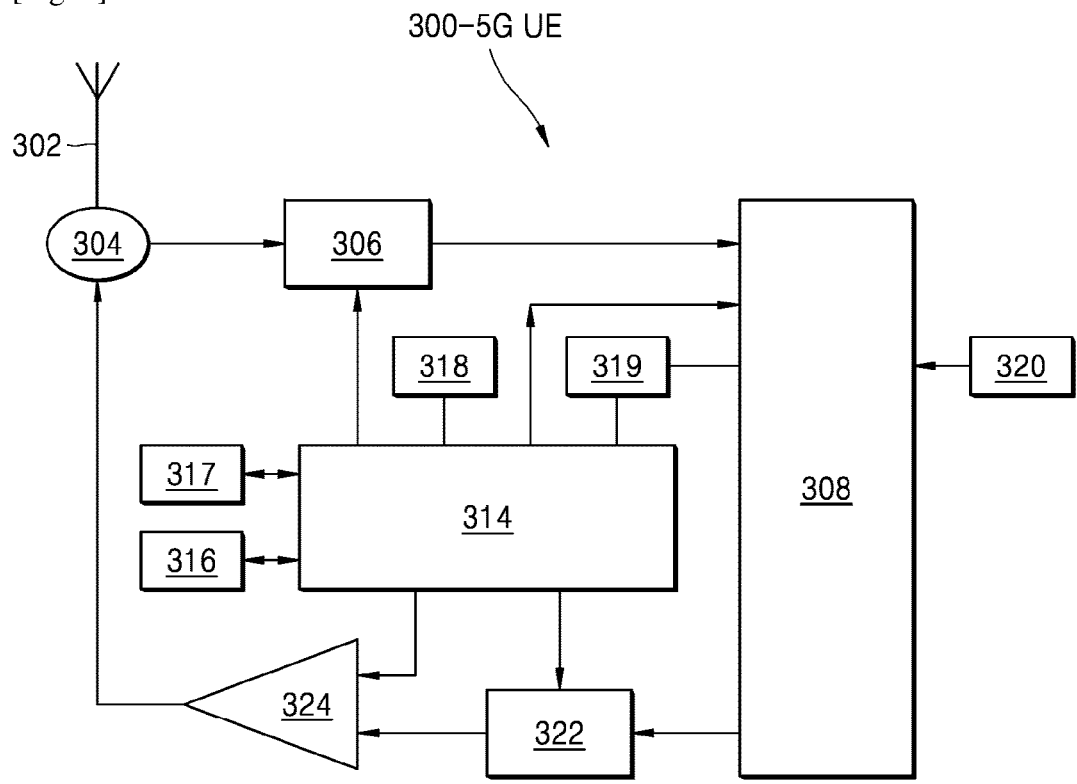
[Fig. 4]
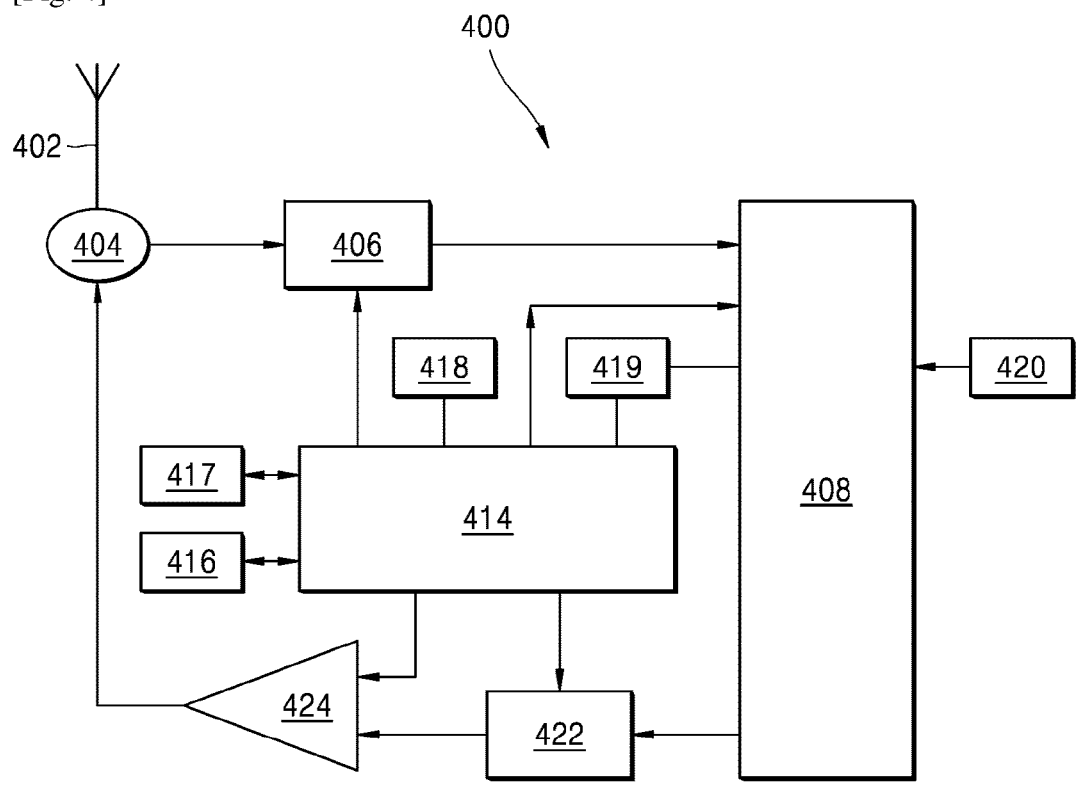

[Fig. 5]
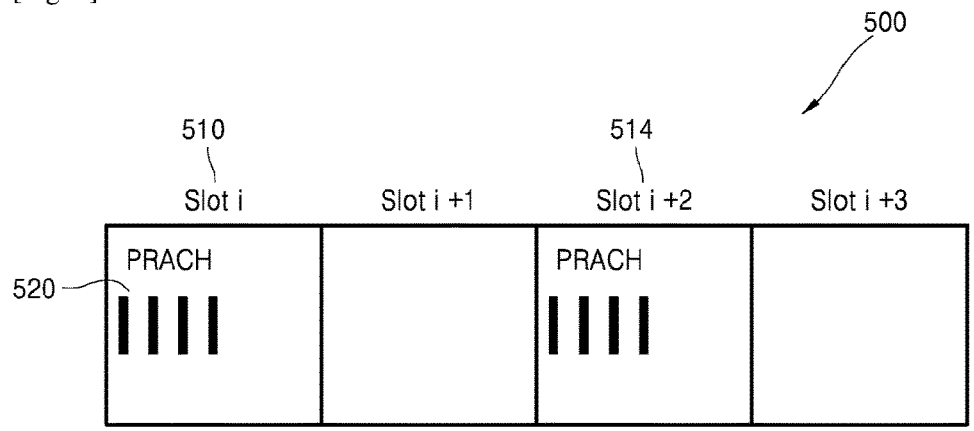
[Fig. 6]
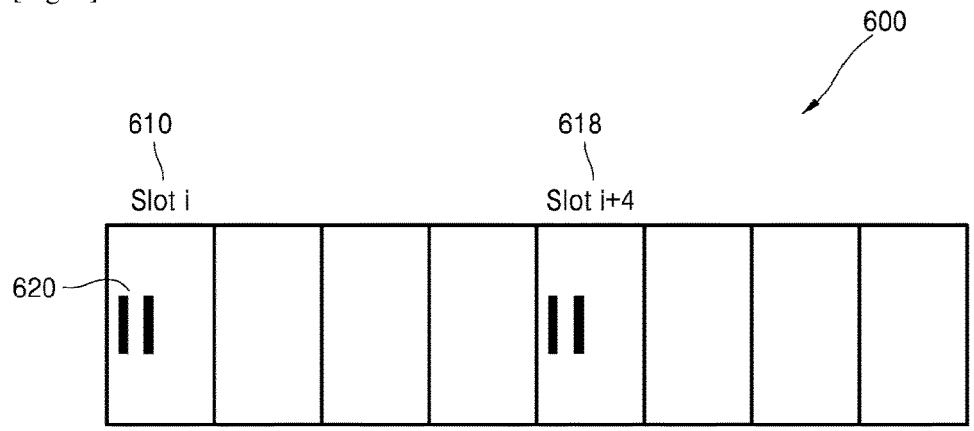
[Fig. 7]
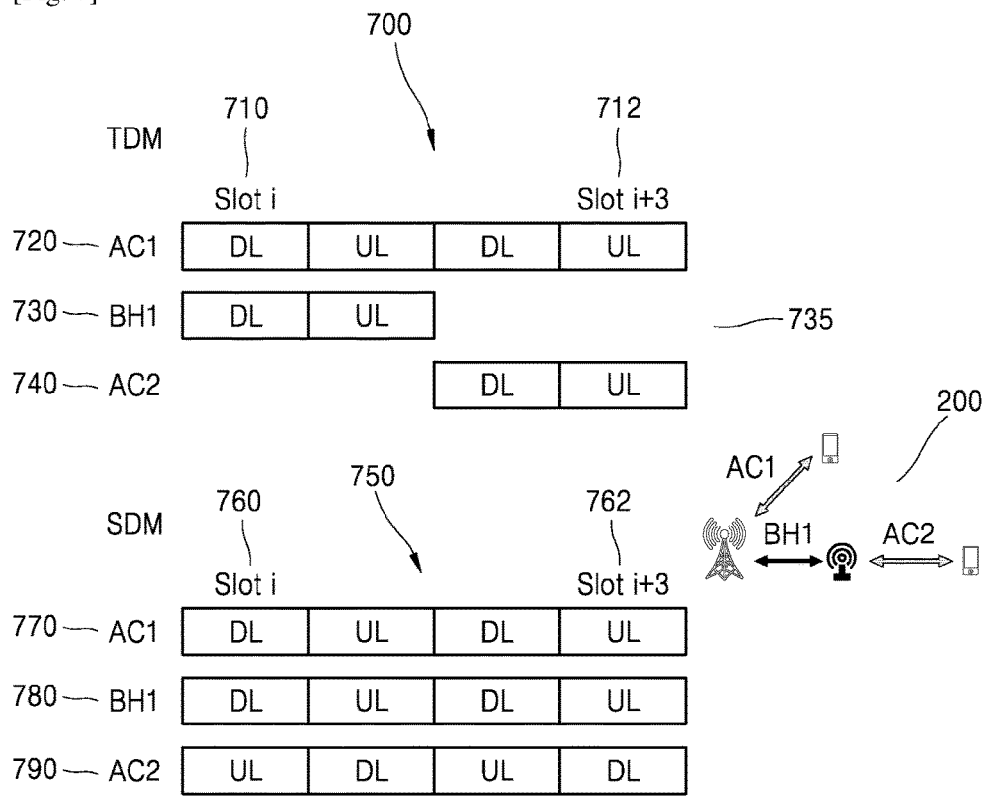

[Fig. 8]
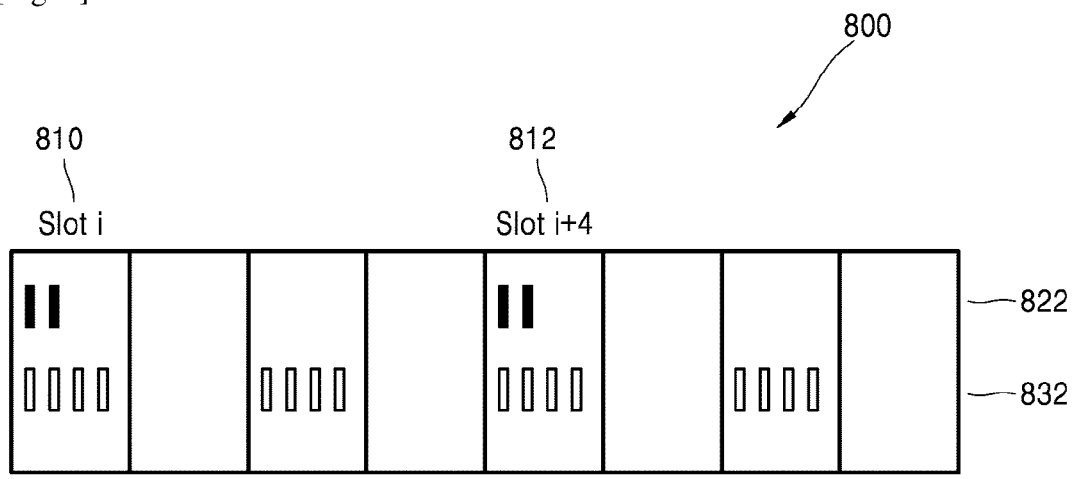
[Fig. 9]
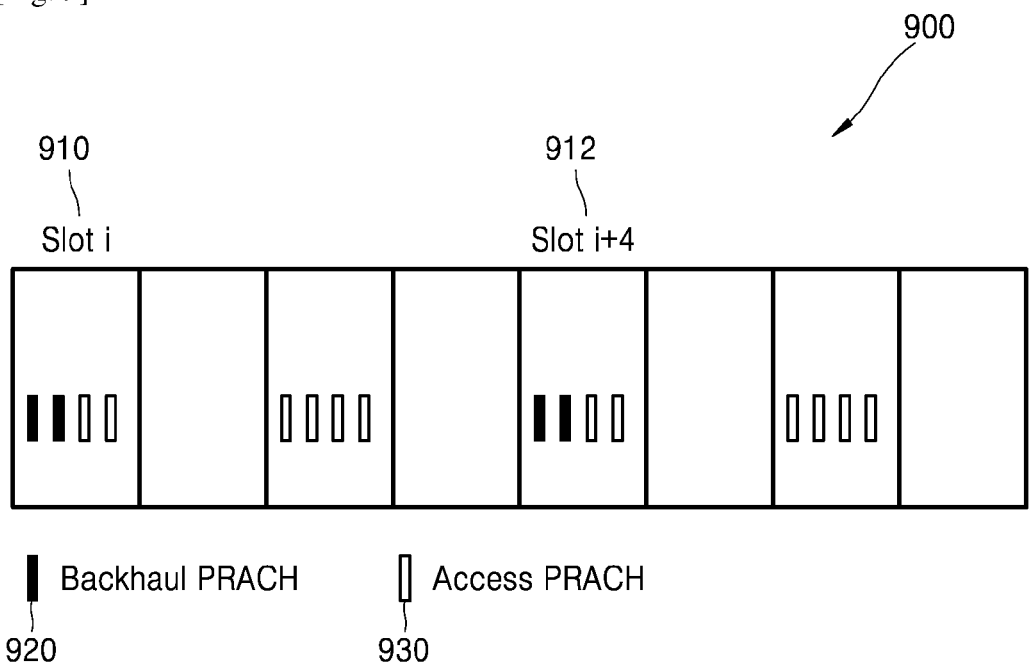

[Fig. 10]
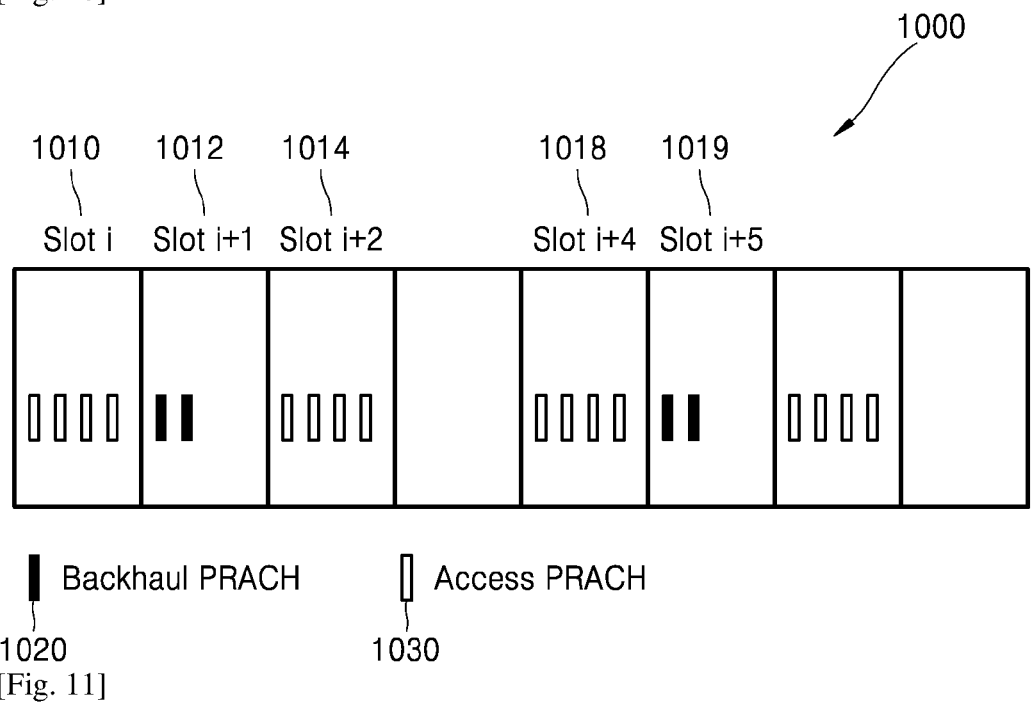
[Fig. 11]
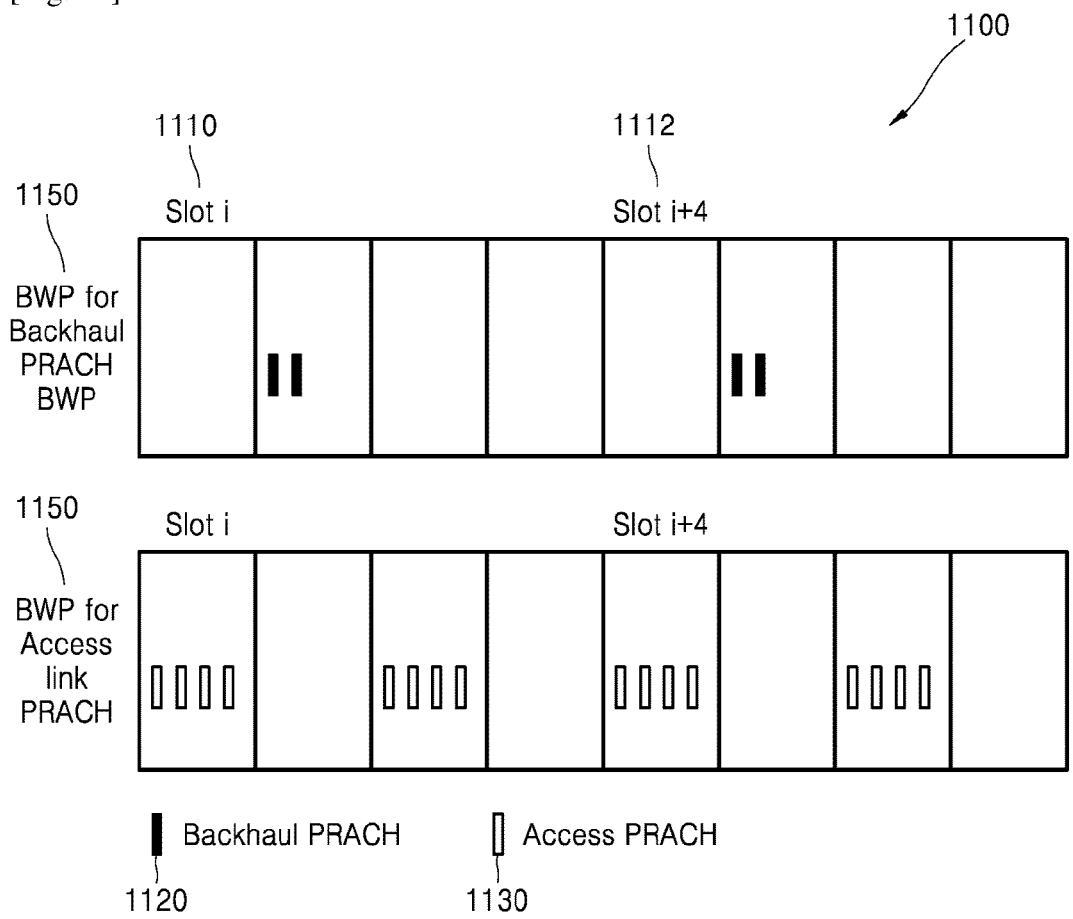

[Fig. 12]
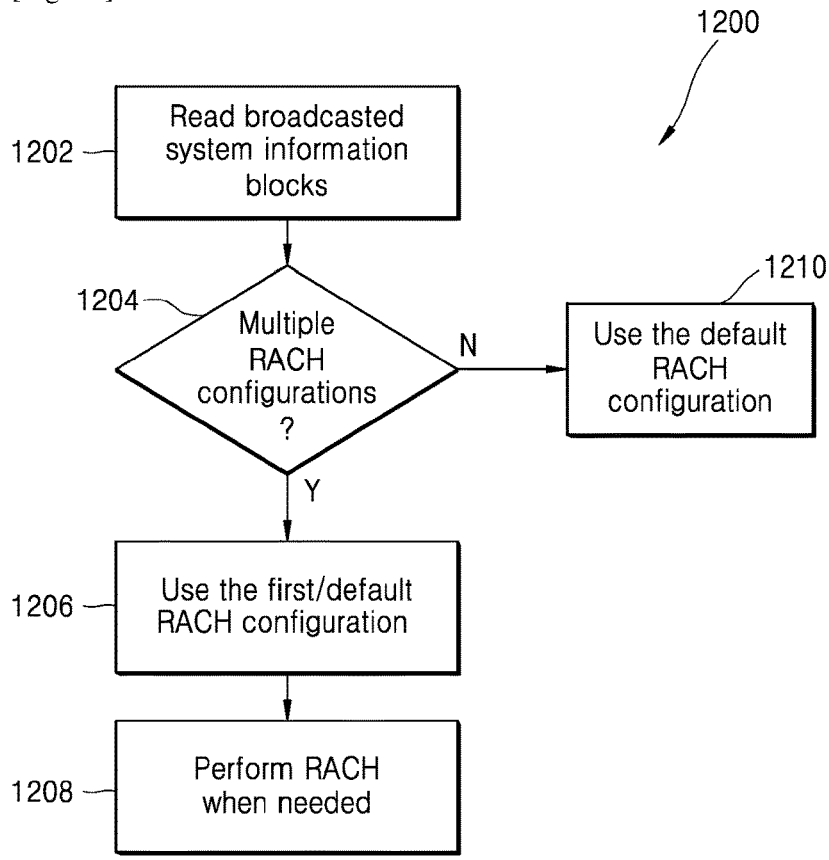
[Fig. 13]
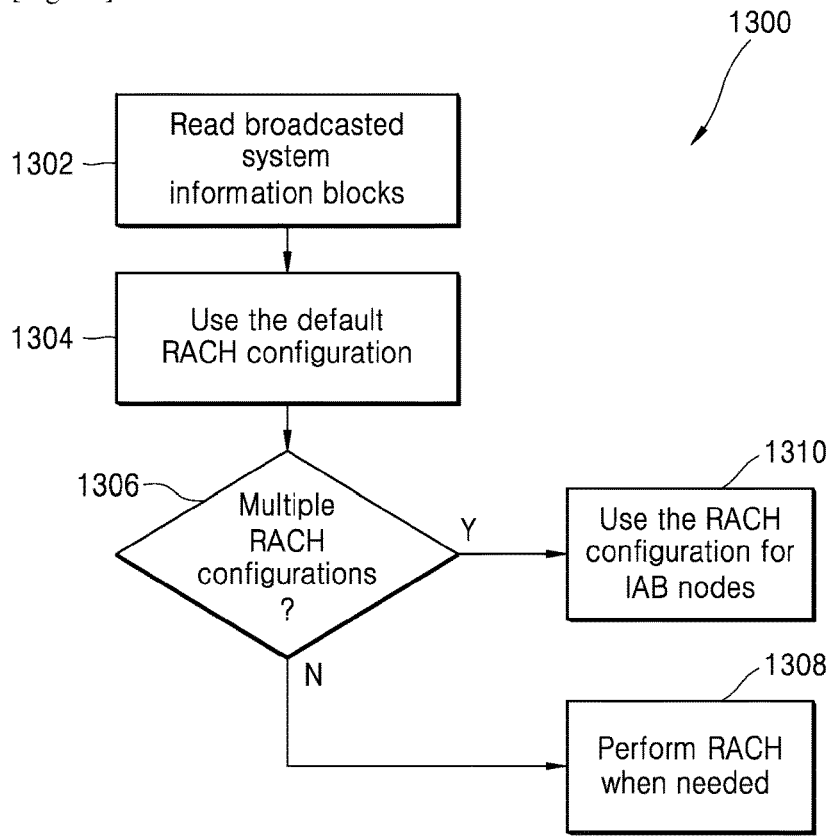

[Fig. 14]
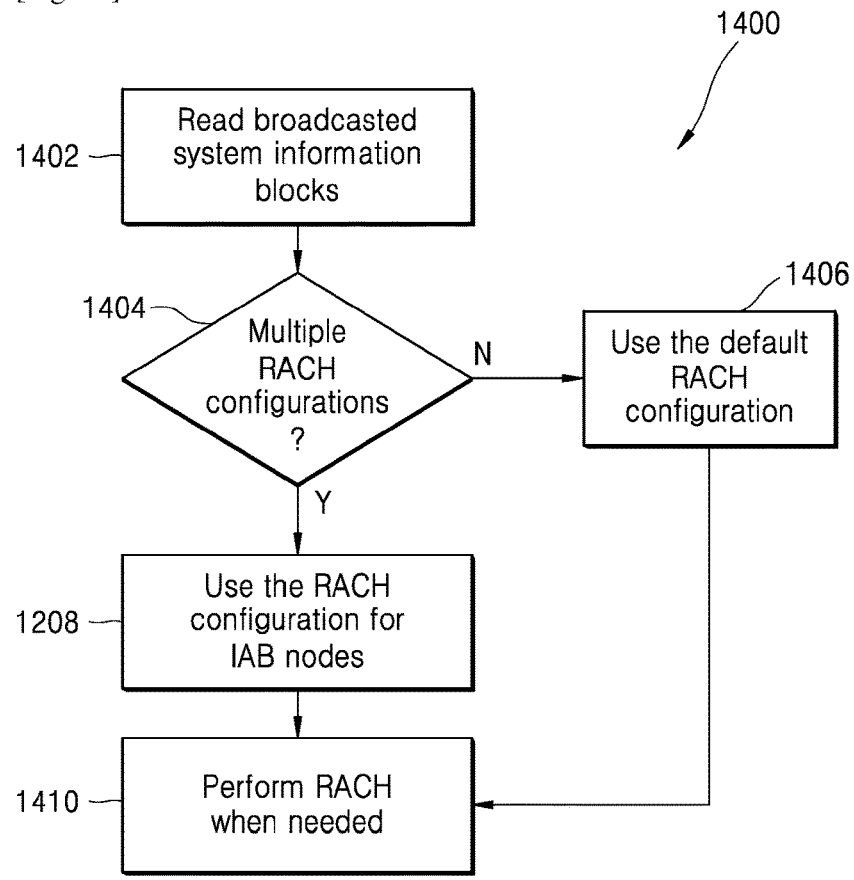
[Fig. 15]
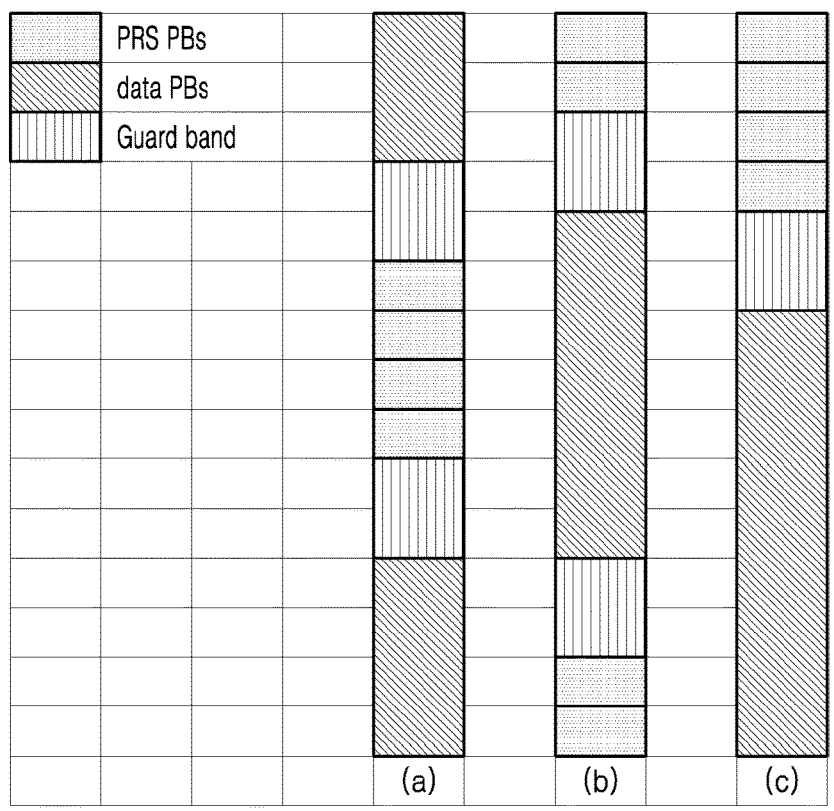

[Fig. 16a]
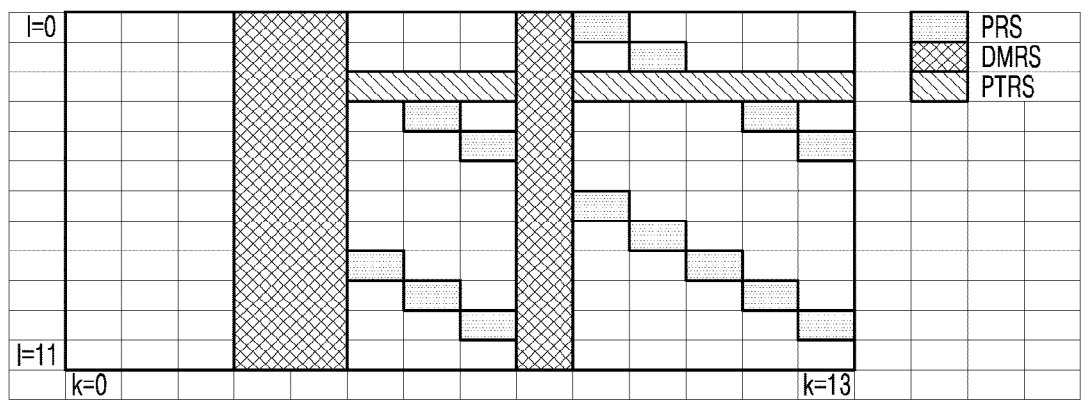
[Fig. 16b]
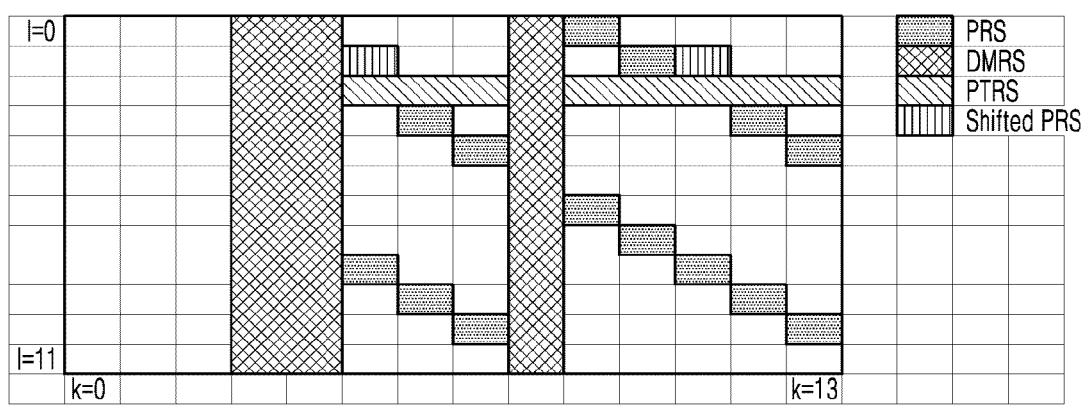
[Fig. 17]
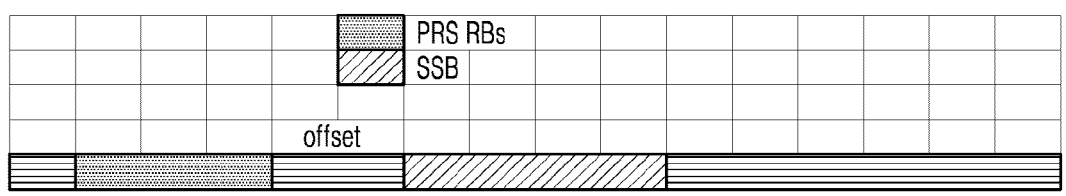
[Fig. 18]
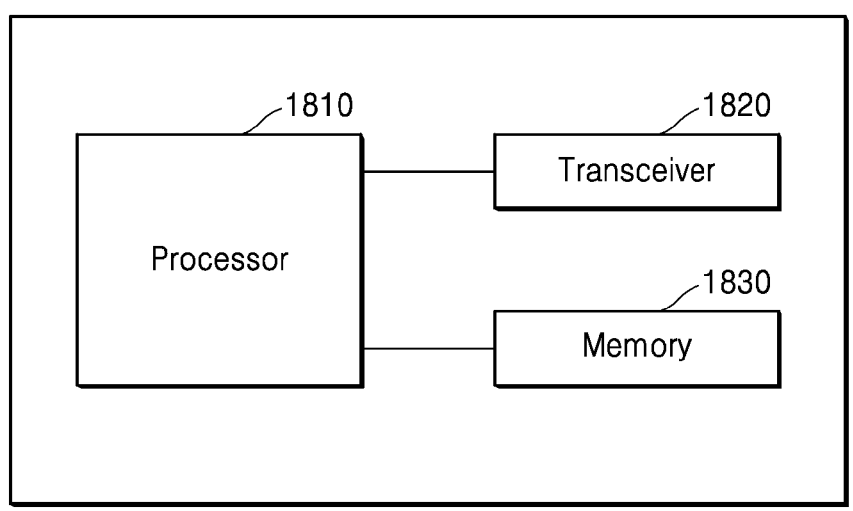

[Fig. 19]
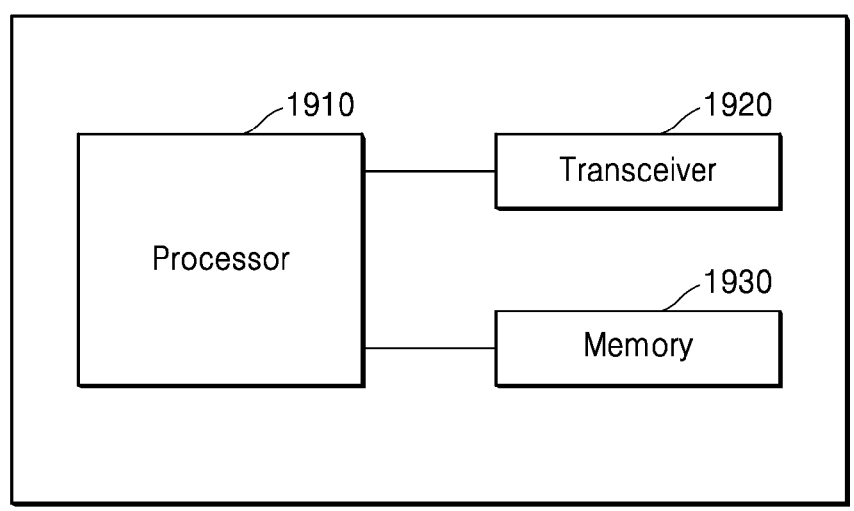

METHOD AND APPARATUS FOR RANDOM ACCESS IN AN INTEGRATED ACCESS AND BACKHAUL COMMUNICATION SYSTEM

PRIORITY

This application is a National Phase Entry of PCT International Application No. PCT/KR2019/009680 which was filed on Aug. 2, 2019, and claims priority to Great Britain Patent Application No. 1812678.9 and 1812976.7, which were filed on Aug. 3, 2018 and Aug. 9, 2018, respectively, the content of each of which is incorporated herein by reference.

TECHNICAL FIELD

The field of this invention relates generally to implementing random access in an integrated access and backhaul communication system. The present invention also relates to improvements in Location based Services (LBS) used in mobile telecommunication networks to provide location information of a particular User Equipment (UE).

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology" "wired/wireless communication and network infrastructure", "service interface technology" and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE OF INVENTION

Solution to Problem

The disclosure provides a method and an apparatus for random access in an integrated access and backhaul communication system.

BRIEF DESCRIPTION OF DRAWINGS

Further details, aspects and embodiments of the invention will be described, by way of example only, with reference to the drawings. In the drawings, similar reference numbers are used to identify like or functionally similar elements. Elements in the figures are illustrated for simplicity and clarity and have not necessarily been drawn to scale.

FIG. 1 illustrates a known simplified 5G architecture configured to support IAB.

FIG. 2 illustrates a simplified 5G architecture configured to support IAB, according to examples of the invention.

FIG. 3 illustrates a block diagram of an UE, adapted in accordance with some example embodiments of the invention.

FIG. 4 illustrates a block diagram of an IAB base station (or node), adapted in accordance with some example embodiments of the invention.

FIG. 5 illustrates a representation of a random access resource allocation for access link, according to examples of the invention.

FIG. 6 illustrates a representation of a Random access resource allocation for backhaul link, according to examples of the invention.

FIG. 7 illustrates a representation of an IAB link that utilises TDM or SDM, according to examples of the invention FIG. 8 illustrates a representation of a Frequency multiplexing of access link and backhaul link random access resources, according to examples of the invention.

FIG. 9 illustrates a representation of a Time multiplexing of access link and backhaul link random access resources, according to examples of the invention.

FIG. 10 illustrates a representation of a Time multiplexing of access link and backhaul link random access resources, according to examples of the invention.

FIG. 11 illustrates a representation of a Time multiplexing of access link and backhaul link random access resources with respect to the carrier bandwidth part (BWP), according to examples of the invention.

FIG. 12 illustrates a simplified flowchart of a UE procedure, in accordance with some example embodiments of the invention.

FIG. 13 illustrates a simplified flowchart of a first method for a IAB node procedure, in accordance with some example embodiments of the invention.

FIG. 14 illustrates a simplified flowchart of a second method for a IAB node procedure, in accordance with some example embodiments of the invention.

FIG. 15 shows PRS RBs multiplexing with data according to an embodiment of the invention.

FIG. 16a shows PRS RBs multiplexing with DMRS/PTRS (with PRS puncturing according to an embodiment of the invention.

FIG. 16b shows PRS RBs multiplexing with DMRS/PTRS (with PRS shifted) according to an embodiment of the invention.

FIG. 17 shows Multiplexing of SSB and PRS according to an embodiment of the invention.

FIG. 18 is a block diagram illustrating the structure of a user equipment according to another embodiment of the present disclosure.

FIG. 19 is a block diagram illustrating the structure of a base station according to another embodiment of the present disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will be further appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

BEST MODE FOR CARRYING OUT THE INVENTION

In accordance with an aspect of the disclosure, An integrated access and backhaul, IAB, wireless communication system comprises a first base station, a second base station, and a plurality of remote wireless communication units, wherein the second base station provides access to a core network, and the first base station requires access to the core network via the second base station, wherein the second base station comprises: a transceiver; and a processor, operably coupled to the transceiver and arranged to: configure a first random access channel, RACH, resource for use by the first base station; and configure a second random access channel, RACH, resource for use by the plurality of remote wireless communication units to access the second base station, wherein the configured second RACH is different to the configured first RACH.

The configured first RACH resource comprises a different preamble format of the RACH compared to the configured second RACH.

The configured first RACH resource comprises a different time configuration of the RACH compared to the configured second RACH.

The configured first RACH resource comprises a different frequency configuration of the RACH compared to the configured second RACH.

The configured first RACH resource comprises a different random access periodicity of the RACH compared to the configured second RACH.

The first RACH resource is allocated with a lower periodicity than the second RACH resource.

The second RACH resource is allocated for use before the first RACH resource.

8. The configured different RACH resources comprise at least one from a group of: symbol, slot, subframe and system frame number, SFN.

9. The same initial RACH access is enabled for access by both the first base station and the plurality of remote wireless communication units, prior to the processor being arranged to configure a subsequent first RACH resource for use by the first base station that differentiates the first RACH resource from the second access link RACH resource used by plurality of remote wireless communication units.

The configured first RACH resource is configured for use by the first base station for both random access and backhaul link communications.

The configured first RACH resource comprises a different orthogonal multiplexing configuration of the RACH compared to the configured second RACH.

The orthogonal multiplexing configuration of the RACH comprises at least one from a group of: frequency multiplexing of access link random access resources and backhaul link random access resources, time multiplexing of access link random access resources and backhaul link random access resources.

The orthogonal time multiplexing configuration of the RACH comprises at least one from a group of: time multiplexing of access link random access resources and backhaul link random access resources within a single time slot, time multiplexing of access link random access resources and backhaul link random access resources that are allocated different time slots, time multiplexing of access link random access resources and backhaul link random access resources that are allocated different bandwidth parts, BWP, of a carrier frequency.

The first base station is configured to perform a RACH with the second base station to support a wireless backhaul link via a relay node to form a multi-hop relay backhaul link.

The first base station is configured to perform a RACH with the second base station in response to a backhaul link being blocked.

The flag indicating IAB RACH is activated and is added to radio resource control, RRC parameters, and at least one RACH information element, IE, parameter in radio resource control, RRC, state, from a group of multiple sets of RACH parameters are configured, where the at least one RACH IE parameter comprises expansion of at least one from a group of: RACH-ConfigCommon, RACH-ConfigGeneric, RACH-ConfigDedicated.

The expansion of the at least one RACH IE parameter comprises at least one from a group of: definition of a new RRC IEs; adding of a new parameter to configure different RACH settings; expansion of a value range of current parameters, to differentiate between RACH configurations.

In accordance with another aspect of the disclosure, a second base station for an integrated access and backhaul, IAB, wireless communication system that communicates with a plurality of remote wireless communication units, wherein the second base station comprises a processor, operably coupled to a transceiver and arranged to: configure a first random access channel, RACH, resource for use by a first base station; and configure a second random access channel, RACH, resource for use by the plurality of remote wireless communication units to access the second base station, wherein the configured second RACH is different to the configured first RACH.

In accordance with another aspect of the disclosure, a remote wireless communication unit in an integrated access and backhaul, IAB, wireless communication system, wherein the remote wireless communication unit comprises: a transceiver; and a processor, operably coupled to the transceiver and arranged to: initiate a random access to a second base station on a second random access channel, RACH, resource, wherein the configured second RACH is different to a configured first RACH allocated for use by a first base station for random access and backhaul link communications.

In accordance with another aspect of the disclosure, a method for random access in an integrated access and backhaul, IAB, wireless communication system that comprises a first base station, a second base station and a plurality of remote wireless communication units, wherein the method comprises at the second base station: configuring a first random access channel, RACH, resource for use by a first base station; and configuring a second random access channel, RACH, resource for use by the plurality of remote wireless communication units to access the second base station, wherein the configured second RACH is different to the configured first RACH.

In accordance with another aspect of the disclosure, a method for random access in an integrated access and backhaul, IAB, wireless communication system that comprises a first base station, a second base station and a plurality of remote wireless communication units, wherein the method comprises at a remote wireless communication unit: initiating a random access to a second base station on a second random access channel, RACH, resource, wherein the configured second RACH is different to a configured first RACH allocated for use by a first base station for random access and backhaul link communications.

In accordance with another aspect of the disclosure, a method of configuring a positioning reference signal in a telecommunication system comprising transmitting the positioning reference signal multiplexed with another signal.

The transmitting the positioning reference signal multiplexed with another signal comprises the simultaneous transmission of the positioning reference signal on one or more subcarriers, different to the one or more subcarriers on which the other signal is transmitted.

The guard band is provided between the one or more subcarriers on which the positioning reference signal is transmitted and the one or more subcarriers on which the other signal is transmitted.

The other signal is one of data and a reference signal.

The reference signal is one of DMRS and PTRS.

The positioning reference signal is either punctured or shifted in the event of collision with CSI-RS, DMRS or PTRS.

In the event of the positioning reference signal being shifted, it is shifted to a neighbouring resource element.

The reference signal is SSB.

The offset is introduced between the positioning reference signal and SSB.

The configuration of PRS and the other signal is performed either by an upper layer or derived implicitly from cell or system parameters.

The positioning reference signal is power boosted to improve hearability.

MODE FOR THE INVENTION

In recent years, third generation (3G) wireless communications have evolved to the long term evolution (LTE) cellular communication standard, sometimes referred to as $4^{th}$ generation (4G) wireless communications. Both 3G and 4G technologies are compliant with third generation partnership project (3GPP™ standards. 4G networks and phones were designed to support mobile internet and higher speeds for activities, such as video streaming and gaming. The 3GPP™ standards are now developing a fifth generation (5G) of mobile wireless communications, which is set to initiate a step change in the delivery of better communications, for example powering businesses, improving communications within homes and spearheading advances such as driverless cars.

One of the potential technologies targeted to enable future cellular network deployment scenarios and applications is the support for wireless backhaul and relay links enabling flexible and very dense deployment of 5G-new radio (NR) cells without a need for densifying the transport network proportionately. Due to the expected larger bandwidth available for NR compared to long term evolved (LTE™ (e.g. mmWave spectrum) along with the native deployment of massive multiple-in/multiple-out (MIMO) or multi-beam systems in NR creates an opportunity to develop and deploy integrated access and backhaul (IAB) links. It is envisaged that this may allow easier deployment of a dense network of self-backhauled NR cells in a more integrated manner, by building upon many of the control and data channels/procedures defined for providing access to UEs. An example illustration of a network with such IAB links is shown in FIG. 1, where IAB nodes (or relay nodes (rTRPs) or relay IAB nodes, as these terms are used interchangeably herein) are configured to multiplex access and backhaul links in time, frequency, or space (e.g. beam-based operation).

Referring to FIG. 1, a known simplified 5G architecture diagram 100 illustrates how an Integrated Access and Backhaul (IAB) network is deployed. Here, a first 5G base station 102 supporting communications within a coverage area 104, including communication support for a wireless communication unit, sometimes referred to as a terminal device, such as a user equipment UE 106. In 5G, the UE 106 is able to support traditional Human Type Communications (HTC) or the new emerging Machine Type Communications (MTC). The known simplified architecture diagram 100 includes a second 5G base station 112 supporting communications within a coverage area 114, including communication support for a UE 116 and a third 5G base station 122 supporting communications within a coverage area 124, including communication support for a UE 126. A wireless backhaul connection 132, 133, generally an Xn (based on X2) interface connects the third 5G base station 122 with the first 5G base station 102 and second 5G base station 112. The third 5G base station 122 is also connected to the core network via a more traditional wired connection, such as fibre 134.

In this regard, in an IAB scenario, node A (i.e. third 5G base station 122) is considered a donor IAB node and node B (i.e. first 5G base station 102) and node C (i.e. second 5G base station 112) are identified as relay IAB nodes.

One of the main objectives of IAB is to provide radio access network (RAN)-based mechanisms to support dynamic route selection to accommodate short-term blocking and transmission of latency-sensitive traffic across backhaul links. This objective is also relevant to resource allocation (RA) between access and backhaul links under half-duplexing constraints. In the NR standard, there are three RA modes defined, namely time division multiplex (TDM), frequency division multiplex (FDM) and space division multiplex SDM (e.g. beam-based operation). No matter which RA scheme is applied, the inventors have identified that there always exists a problem for inter-relay channel monitoring for topology management when a communication (backhaul) blockage occurs.

When nodes B and C conduct random access, they can follow the same procedure as the UEs within the coverage of node A, e.g. UE 126. However, if the backhaul link 132 between node B and node A is blocked, node B might need to be connected to node C to form a multi-hop relay network. In such a case, the distance between node B and node C could be much larger than the distance between the node C UE 116 and node C (i.e. second 5G base station 112). Since the random access preamble format is decided by the cell radius, the preamble used for node C UE 116 might not be suitable for another IAB node, e.g., node B (i.e. first 5G base station 102).

Demand for mobile services is expanding quickly and one of the fastest growing segments is Location Based Services (LBS), primarily driven by two major requirements: emergency services and commercial applications. Emergency services desire to know the location of a UE in the event of, for instance, a vehicular accident. Commercial applications desire to know the location of a UE so that the user can be presented with relevant information or advertisements such as, for instance, restaurant deals in his vicinity.

In response to these needs, second and third generation networks (WCDMA, GSM, CDMA) have added support for several positioning technologies, which vary in their accuracy and Time to First Fix (TTFF) performance. 3GPP Release 9 for LTE defines support for various positioning technologies: Extended Cell ID (ECID), Assisted Global Navigation Satellite System (A-GNSS), Observed Time Difference Of Arrival (OTDOA) and LTE Positioning Protocol (LPP), a new positioning protocol. A new reference signal, i.e. positioning reference signal (PRS) has been defined in LTE, to support this new protocol.

Further in Release 11 of LTE, Uplink Observed Time Different of Arrival (UOTDA) has been adopted using Sounding Reference Signal (SRS) measurement. 3GPP Release 15 defines support for some (Radio Access Technology) RAT-independent positioning techniques, such as Real Time Kinematic (RTK) GNSS, to improve the accuracy of LTE positioning.

Embodiments of the present invention aim to address problems encountered in the prior art whether mentioned here or not.

Examples of the invention describe a wireless communication system that includes a mechanism for improved efficiency of random access for IAB nodes in an IAB architecture. In particular, examples of the invention propose to use different random access configurations for IAB nodes and UEs. Within this concept, a number of approaches are described to differentiate the random access of IAB nodes and UEs, such as respective use of different preamble formats, respective use of different time/frequency configurations.

Although example embodiments of the invention are described with reference to different random access configurations for IAB nodes and UEs in a 5G architecture, it is envisaged that some aspects of the invention are not so constrained/limited. For example, it is envisaged that the different random access configurations may be enacted for a long Term Evolved (LTE™ system, or other such communication systems that utilise random access techniques.

Example embodiments are described with respect to FR2, since the main focus of IAB is on above FR2, i.e., 24.25 GHz-52.6 GHz. However, it is envisaged that the examples described herein apply equally to FR1, i.e. 450 MHz-6 GHz.

Example embodiments are described with reference to radio access networks, which term encompasses and is considered to be equivalent to and interchangeable with communication cells, namely the facilitation of communications within a cell that may access other parts of the communication system as a whole.

In a first aspect of the invention, an integrated access and backhaul, IAB, wireless communication system is described that includes a first base station, a second base station, and a plurality of remote wireless communication units, wherein the second base station provides access to a core network, and the first base station requires access to the core network via the second base station. The second base station includes: a transceiver; and a processor, operably coupled to the transceiver and arranged to: configure a first random access channel, RACH, resource for use by the first base station; and configure a second random access channel, RACH, resource for use by the plurality of remote wireless communication units to access the second base station, wherein the configured second RACH is different to the configured first RACH.

In this manner, by configuring separate and distinct RACH operations for both the wireless remote communication units, e.g. UEs, and an IAB node to use a backhaul link, for example in a multi-hop relay arrangement, a more efficient use of the backhaul link can be achieved, particularly when a backhaul link is blocked.

In some optional examples, for example in a 5G system, the configured first RACH resource may include a different preamble format of the RACH compared to the configured second RACH. In some optional examples, the configured first RACH resource may include a different time configuration of the RACH compared to the configured second RACH. In some optional examples, the configured first RACH resource comprises a different frequency configuration of the RACH compared to the configured second RACH. In some optional examples, the configured first RACH resource may include a different random access periodicity of the RACH compared to the configured second RACH. In some optional examples, the first RACH resource may be allocated with a lower periodicity than the second RACH resource. In some optional examples, the second RACH resource may be allocated for use before the first RACH resource. Moreover, there is no need to keep the same random access periodicity for UEs and IAB nodes since the connection between IAB nodes needs to be maintained after the first random access, and thus requires much less frequent random access when compared with the UE random access.

In some optional examples, the configured different RACH resources may include at least one from a group of: symbol, slot, subframe and system frame number, SFN. In some optional examples, a same initial RACH access may be enabled for access by both the first base station and the plurality of remote wireless communication units, prior to the processor being arranged to configure a subsequent first RACH resource for use by the first base station that differentiates the first RACH resource from the second access link RACH resource used by plurality of remote wireless communication units. In some optional examples, the configured first RACH resource may be configured for use by the first base station for both random access and backhaul link communications. In some optional examples, the configured first RACH resource may include a different orthogonal multiplexing configuration of the RACH compared to the configured second RACH. In some optional examples, the orthogonal multiplexing configuration of the RACH comprises at least one from a group of: frequency multiplexing of access link random access resources and backhaul link random access resources, time multiplexing of access link random access resources and backhaul link random access resources. In some optional examples, orthogonal time multiplexing configuration of the RACH may include at least one from a group of: time multiplexing of access link random access resources and backhaul link random access resources within a single time slot, time multiplexing of access link random access resources and backhaul link random access resources that are allocated different time slots, time multiplexing of access link random access resources and backhaul link random access resources that are allocated different bandwidth parts, BWP, of a carrier frequency.

In some optional examples, the first base station may be configured to perform a RACH with the second base station to support a wireless backhaul link via a relay node to form a multi-hop relay backhaul link. In some optional examples, the first base station may be configured to perform a RACH with the second base station in response to a backhaul link being blocked.

In some optional examples, at least one RACH information element, IE, parameter in radio resource control, RRC, state, from a group of multiple sets of RACH parameters may be configured, where the at least one RACH IE parameter comprises expansion of at least one from a group of: RACH-ConfigCommon, RACH-ConfigGeneric, RACH-ConfigDedicated. In some optional examples, the expansion of the at least one RACH IE parameter may include at least one from a group of: definition of a new RRC IEs; adding of a new parameter to configure different RACH settings; expansion of a value range of current parameters, to differentiate between RACH configurations.

In a second aspect of the invention, second base station for an integrated access and backhaul, IAB, wireless communication system according to the first aspect is described.

In a third aspect of the invention, remote wireless communication unit, such as a UE, for an integrated access and backhaul, IAB, wireless communication system according to the first aspect is described.

In a fourth aspect of the invention, a method for random access in an integrated access and backhaul, IAB, wireless communication system performed by the second base station according to the second aspect is described.

In a fifth aspect of the invention, a method for random access in an integrated access and backhaul, IAB, wireless communication system performed by the remote wireless communication unit, such as a UE, according to the third aspect is described.

In a sixth aspect of the invention, there is provided a method of configuring a positioning reference signal in a telecommunication system comprising transmitting the positioning reference signal multiplexed with another signal.

Referring now to FIG. 2, part of a wireless communication system 200 is shown in outline, in accordance with one example embodiment of the invention. The wireless communication system 200 illustrates how an Integrated Access and Backhaul (IAB) network may be deployed in accordance with one example embodiment of the invention, where separate RACH is provided for use by an IAB node, e.g. a relay IAB node requiring a backhaul link or RACH access, and UEs requiring RACH access. Here, a donor IAB node A (sometimes referred to as a parent IAB node) 222 is configured to receive first access control RACH requests 250 from wireless communication units, sometimes referred to as a terminal device, such as a user equipment UE 226. In the context of the present invention, a relay IAB node B (e.g. a 5G base station) 202 uses a separate second RACH to access the donor IAB node to form a backhaul link 'AB' 232. Such a backhaul link may also carry communications to/from a second UE B 206, which has used a RACH access 255 to connect to the relay IAB node B 202.

Similarly, a further relay IAB node C (e.g. a 5G base station) 212 uses a separate RACH to access the relay IAB node B 202 to form a backhaul link 'BC' 235, and thereafter the donor IAB node by joining the backhaul link 'AB' 232. Such a backhaul link may also carry communications to/from a third UE C 216, which has used a RACH access 260 to connect to the further relay IAB node C 212. In particular, examples of the invention propose to use different random access configurations for IAB nodes 202 and UEs such as UE 226. Within this concept, a number of approaches are described to differentiate the random access of IAB nodes and UEs, such as respective use of different preamble formats, respective use of different time/frequency configurations In accordance with one example of the invention, the IAB nodes 202, 212 and UEs such as UE 226 are allocated different preamble formats within RACH, to identify to the recipient (donor) IAB node 222 whether the RACH emanated from another IAB node 202, for example due to a backhaul blockage, or whether the RACH emanated from a UE 226. In accordance with another example of the invention, the IAB nodes 202, 212 and UEs, such as UE 226, are allocated different time and/or frequency configurations within RACH, to identify to the recipient (donor) IAB node 222 whether the RACH emanated from another IAB node 202, for example due to a backhaul blockage, or whether the RACH emanated from a UE 226.

In the context of the present invention, the selection of preamble formats to be divided between IAB use and UE use can be made from the known preamble formats. The preamble formats for FR2 are defined in the below [table 1] from the 3GPP standard at 6.3.3.1-2:

TABLE 1

Preamble formats for $L_{RA} = 139$ and
$\Delta f^{RA} = 15 \cdot 2^{\mu}$ kHz where $\mu \in \{0, 1, 2, 3\}$

| Format | $L_{RA}$ | $\Delta f^{RA}$ | $N_u$ | $N_{CP}^{RA}$ | Support for restricted sets |
|---|---|---|---|---|---|
| A1 | 139 | $15 \cdot 2^{\mu}$ kHz | $2 \cdot 2048 \cdot \kappa \cdot 2^{-\mu}$ | $288 \kappa \cdot 2^{-\mu}$ | — |
| A2 | 139 | $15 \cdot 2^{\mu}$ kHz | $4 \cdot 2048 \cdot \kappa \cdot 2^{-\mu}$ | $576 \kappa \cdot 2^{-\mu}$ | — |

TABLE 1-continued

Preamble formats for $L_{RA} = 139$ and
$\Delta f^{RA} = 15 \cdot 2^\mu$ kHz where $\mu \in \{0, 1, 2, 3\}$

| Format | $L_{RA}$ | $\Delta f^{RA}$ | $N_u$ | $N_{CP}^{RA}$ | Support for restricted sets |
|---|---|---|---|---|---|
| A3 | 139 | $15 \cdot 2^\mu$ kHz | $6 \cdot 2048 \kappa \cdot 2^{-\mu}$ | $864 \kappa \cdot 2^{-\mu}$ | — |
| B1 | 139 | $15 \cdot 2^\mu$ kHz | $2 \cdot 2048 \kappa \cdot 2^{-\mu}$ | $216 \kappa \cdot 2^{-\mu}$ | — |
| B2 | 139 | $15 \cdot 2^\mu$ kHz | $4 \cdot 2048 \kappa \cdot 2^{-\mu}$ | $360 \kappa \cdot 2^{-\mu}$ | — |
| B3 | 139 | $15 \cdot 2^\mu$ kHz | $6 \cdot 2048 \kappa \cdot 2^{-\mu}$ | $504 \kappa \cdot 2^{-\mu}$ | — |
| B4 | 139 | $15 \cdot 2^\mu$ kHz | $12 \cdot 2048 \kappa \cdot 2^{-\mu}$ | $936 \kappa \cdot 2^{-\mu}$ | — |
| C0 | 139 | $15 \cdot 2^\mu$ kHz | $2048 \kappa \cdot 2^{-\mu}$ | $1240 \kappa \cdot 2^{-\mu}$ | — |
| C2 | 139 | $15 \cdot 2^\mu$ kHz | $4 \cdot 2048 \kappa \cdot 2^{-\mu}$ | $2048 \kappa \cdot 2^{-\mu}$ | — |

Access link and backhaul link have different requirements on random access link budget and preamble cyclic prefix (CP) length. For example, the random access link budget is relevant to a repetition level of the random access signature, i.e., $N_u$. CP length, i.e., $N_{CP}^{RA}$ determines the cell size, and these parameters are defined in 3GPP TS38.213.

Furthermore, the access link, such as access link AA 250 requires a much higher random access link budget than the backhaul link AB 232 with IAB node 202 because of the much lower transmission power. However, it also requires a shorter CP length, since the distance between the UE 226 and its associated IAB node 222 is less than that between two IAB nodes 222, 202. In this regard, examples of the invention propose to use, say, the preamble C2 format for IAB RACH access to another IAB, as C2 contains the longest CP that is configured to both access link and backhaul link. Thus, the C2 preamble format is able to support 9.3 km as the maximum distance between two IAB nodes. However, since the random access signature is only repeated 4 times, the link budget might not be enough for access link. On the contrary, if a preamble B4 format with 12 repetitions is configured, the access link budget can be improved by 4.7 dB but the maximum distance supported is almost halved and thus IAB node B in FIG. 2 might not be able to establish connection with IAB node C. Thus, examples of the invention propose to adopt different preamble formats, dependent upon the specific prevailing conditions, which in most instances can be selected in the IAB node implementation.

FIG. 3 illustrates a high level block diagram of a wireless communication unit such as a user equipment (UE) 300 contains an antenna 302, for receiving transmissions, coupled to an antenna switch or duplexer 304 that provides isolation between receive and transmit chains within the UE 300. One or more receiver chains, as known in the art, include receiver front-end circuitry 306 (effectively providing reception, filtering and intermediate or base-band frequency conversion). The receiver front-end circuitry 306 is coupled to a signal processing module 308 (generally realized by a digital signal processor (DSP)). A skilled artisan will appreciate that the level of integration of receiver circuits or components may be, in some instances, implementation-dependent.

The controller 314 maintains overall operational control of the wireless communication unit 300. The controller 314 is also coupled to the receiver front-end circuitry 306 and the signal processing module 308. In some examples, the controller 314 is also coupled to a frequency generation circuit 317 and a memory device 316 that selectively stores operating regimes, such as decoding/encoding functions, synchronization patterns, code sequences, and the like. A timer 318 is operably coupled to the controller 314 to control the timing of operations (e.g. transmission or reception of time-dependent signals) within the UE 300.

As regards the transmit chain, this essentially includes an input module 320, coupled in series through transmitter/modulation circuitry 322 and a power amplifier 324 to the antenna 302, antenna array, or plurality of antennas. The transmitter/modulation circuitry 322 and the power amplifier 324 are operationally responsive to the controller 314.

The signal processor module 308 in the transmit chain may be implemented as distinct from the signal processor in the receive chain. Alternatively, a single processor may be used to implement a processing of both transmit and receive signals, as shown in FIG. 3. Clearly, the various components within the wireless communication unit 325 can be realized in discrete or integrated component form, with an ultimate structure therefore being an application-specific or design selection.

In accordance with examples of the invention, the processor 308 and transceiver (e.g. transmitter/modulation circuitry 322) of the IAB node are configured to communicate with another IAB node (e.g. 5G gNB) in an IAB architecture by using a RACH that is configured with a UE-specific preamble format, in order to distinguish the UE RACH from another RACH received at the recipient IAB node from another IAB node. The processor 308 and receiver front-end circuitry 306 are also configured to receive an acknowledgement of a successful RACH attempt in response to the UE-specific preamble format.

In accordance with examples of the invention, the processor 308 and transceiver (e.g. transmitter/modulation circuitry 322) of the UE are additionally or alternatively configured to communicate with an IAB node in an IAB architecture by using a RACH that is configured with UE-specific time and/or frequency configurations, in order to distinguish the UE RACH from another IAB node RACH. In this example, the processor 308 and receiver front-end circuitry 306 are configured to receive an acknowledgement of a successful RACH attempt in response to the UE-specific time and/or frequency configurations.

Referring now to FIG. 4, high level block diagram of an IAB node (e.g. a 5G wireless base station) 400 is illustrated, where the IAB node 400 has been adapted in accordance with some example embodiments of the invention. The IAB node 400 contains an antenna 402, for receiving transmissions, coupled to an antenna switch or duplexer 404 that provides isolation between receive and transmit chains within the IAB node 400. One or more receiver chains, as known in the art, include receiver front-end circuitry 406 (effectively providing reception, filtering and intermediate or base-band frequency conversion). The receiver front-end circuitry 406 is coupled to a signal processing module 408 (generally realized by a digital signal processor (DSP)). A skilled artisan will appreciate that the level of integration of receiver circuits or components may be, in some instances, implementation-dependent.

The controller 414 maintains overall operational control of the IAB node 400. The controller 414 is also coupled to the receiver front-end circuitry 406 and the signal processing module 408. In some examples, the controller 414 is also coupled to a frequency generation circuit 417 and a memory device 416 that selectively stores operating regimes, such as decoding/encoding functions, synchronization patterns, code sequences, and the like. A timer 418 is operably coupled to the controller 414 to control the timing of operations (e.g. transmission or reception of time-dependent signals) within the IAB node 400.

As regards the transmit chain, this essentially includes an input module 420, coupled in series through transmitter/modulation circuitry 422 and a power amplifier 424 to the antenna 402, antenna array, or plurality of antennas. The transmitter/modulation circuitry 422 and the power amplifier 424 are operationally responsive to the controller 414. The signal processor module 408 in the transmit chain may be implemented as distinct from the signal processor in the receive chain. Alternatively, a single processor may be used to implement a processing of both transmit and receive signals, as shown in FIG. 4. Clearly, the various components within the IAB node 400 can be realized in discrete or integrated component form, with an ultimate structure therefore being an application-specific or design selection.

In accordance with examples of the invention, the processor 408 and transceiver (e.g. transmitter/modulation circuitry 422) of the IAB are configured to communicate with another IAB node in an IAB architecture by using a RACH that is configured with an IAB node-specific preamble format, in order to distinguish the IAB node RACH from another RACH received at the recipient IAB node from a UE. The processor 408 and receiver front-end circuitry 406 are also configured to receive an acknowledgement of a successful RACH attempt in response to the IAB node-specific preamble format.

In accordance with examples of the invention, the processor 408 and transceiver (e.g. transmitter/modulation circuitry 422) of the IAB node are additionally or alternatively configured to communicate with an IAB node in an IAB architecture by using a RACH that is configured with IAB node-specific time and/or frequency configurations, in order to distinguish the IAB node RACH from a UE RACH. In this example, the processor 408 and receiver front-end circuitry 406 are configured to receive an acknowledgement of a successful RACH attempt in response to the IAB node-specific time and/or frequency configurations.

Different Time/Frequency RACH Configurations to Differentiate Access Requests Between IABs and UEs:

The number of UEs associated with one IAB node, e.g., IAB node C in FIG. 2, could be much larger than the number of IAB nodes connected to IAB node C. In fact, in practice, there might be only a very limited number of IAB nodes expected to be connected to a parent IAB node (i.e. an IAB node that serves relay IAB nodes). In NR, some resources in terms of symbol, slot, subframe and system frame number (SFN) are allocated for physical random access channels (PRACH) as shown in FIG. 5 and the periodicity of such resources are short so that UEs are able to transmit their random access preambles as soon as possible without causing too many collisions. Thus, referring now to FIG. 5, a representation 500 of a random access resource allocation for access link using different timeslots is illustrated, according to examples of the invention. For example, FIG. 5 illustrates a 5G subframe, with slot i 510 and slot i+2 514 allocated for PRACH 520. As the number of UEs associated with one (parent) IAB node, e.g., is likely to be much larger than the number of IAB nodes, examples of the invention propose that the UE is allocated more of the PRACH opportunities in more frequent timeslots, as compared to RACH allocations for IAB nodes.

Thus, for IAB node random access, the collision probability is much lower due to a limited number of IAB nodes.

Hence, the periodicity of such resources, between successively used RACH slots, can be configured larger as shown in FIG. 6. Referring now to FIG. 6, a representation 600 of a random access resource allocation for backhaul link for IAB nodes is illustrated, according to examples of the invention. Here, a 5G subframe, with slot i 610 and slot i+4 618 are allocated for PRACH 620 for use by IAB nodes.

In some examples of the invention, it is envisaged that an IAB node RACH may be distinguished from a UE RACH once the initial RACH access is completed. In this first case, it is envisaged that an IAB node initially performs a random access (RA) procedure as if the IAB node is a UE. Thus, in this example, the IAB node may use a same RACH preamble format as well as time-frequency resources as would be expected for use by a UE. However, if an IAB node is configured by its parent IAB node via, say, low layer signalling (e.g., DCI) or upper layer signalling (e.g., MAC CE or RRC), so that it is aware of radio resources allocated to backhaul links, and once the initial access is complete, the parent IAB node may allocate RACH resources for backhaul. In this example, these subsequently allocated backhaul resources are differentiated from access link RACH resources, and thus may be used by the IAB node for a backhaul.

Thus, in this example, two stages are performed: a first initial random access stage; and a second random access stage after the initial random access. In first initial random access stage, IAB nodes cannot differentiate access link random access resources/preamble formats from backhaul link random access resources/preamble formats. Thus, such information is broadcasted by the parent node. In the second random access stage, IAB nodes identify the backhaul link resources.

FIG. 7 illustrates a representation of an IAB link that utilises TDM 700 or SDM 750, according to the aforementioned example of the invention. In a first TDM 700 example, a first access channel (AC1) 720 includes downlink slots 710 and uplink slots 712. Once the initial access is complete, the parent IAB node may allocate first RACH resources for backhaul use (e.g. allocate first backhaul link resource (BH1) 730 and allocate second RACH resources for access use (e.g. allocate second access link resource (AC2) 740, thereby distinguishing between 735 the UE RACH and IAB RACH.

In a second SDM 750 example, a first access channel (AC1) 770 again includes downlink slots 760 and uplink slots 762. Once the initial access is complete, the parent IAB node may allocate first RACH resources for backhaul use (e.g. allocate first backhaul link resource (BH1) 780 with a structure that enables backhaul link resources to use odd slot numbers for downlink and even number slot numbers for uplink). In contrast, the parent IAB node may allocate second RACH resources for access use that are distinguished from the backhaul link resources (e.g. allocate second access link resource (AC2) 790 with a structure that enables access link resources to use odd slot numbers for uplink and even number slot numbers for downlink.

It can be seen that for TDM access line AC1 and BH link BH1 still use the same time-frequency resources in slot i (DL) and slot i+1 (UL). For SDM, in slot i+1 the same time-frequency resources are actually used by access link AC1 (UL), backhaul link BH1(UL) and access link AC 2(DL). For both schemes, AC1 and BH1 use the same time-frequency resources in slot i+1 for UL, where the RACH resources should be allocated. In such a case, the backhaul resources and access resources are expected to be overlapping and thus cannot be differentiated. Therefore, orthogonal multiplexing should be applied if different preamble formats/periodicity configurations are needed for access link and backhaul link random access, to resolve such potential resource conflict problems.

In some examples of the invention, for orthogonal multiplexing may be employed to distinguish between IAB node usage of a RACH and a UE usage of a RACH. In some examples, it is envisaged that different preamble formats needed by access and backhaul links, respectively, may also configure orthogonal resources for access link and backhaul link random access in terms of time and/or frequency. In some examples, such orthogonal multiplexing may be employed from the beginning of RACH procedure.

In a first orthogonal multiplexing example of the invention, orthogonal multiplexing is performed in a frequency domain, as illustrated in FIG. 8. FIG. 8 illustrates one example of a representation 800 of a frequency multiplexing of access link random access resources 830 and backhaul link random access resources 820, according to examples of the invention. In this example, both access link PRACH and backhaul link PRACH may utilise the same (or indeed different) time locations, e.g., symbol. However, the access link random access resources 830 and backhaul link random access resources 820, will always be separated and differentiated by use on the two different frequencies 832, 822, as shown in FIG. 8. In NR, it is already possible to configure multiple PRACH resources up to N. Thus, in some examples, it is envisaged that a bit map may be used to indicate the PRACH resources used for IAB or alternatively, ceiling($\log_2(N)$) bits can be used to indicate one PRACH resource to be used for IAB.

One benefit of this first orthogonal multiplexing example of the invention is that it may provide maximum flexibility in the sense that the backhaul link random access can be completely separated from access link random access. However, this first orthogonal multiplexing example requires more resources allocated to PRACH.

In a second orthogonal multiplexing example of the invention, orthogonal multiplexing is performed in a time domain, as illustrated in FIG. 9, where some of the time resources for access PRACH are used for backhaul PRACH. FIG. 9 illustrates one example of a representation 900 of a time multiplexing of access link and backhaul link random access resources, according to examples of the invention. In this example, the same frequency is used for both backhaul PRACH 920 by the IAB node and access PRACH 930, for example by the IAB node or UE node. As illustrated, in this example, the 'sharing' between access link random access resources 930 and backhaul link random access resources 920 may be limited to sharing occasional time slots, such as slot i 910 and slot i+4 912, as shown, due to the less frequent need to support backhaul PRACH.

One benefit of this second orthogonal multiplexing example is that no additional resources are needed for backhaul PRACH. However, in some instances, it is envisaged that some disruption to access PRACH may be created.

FIG. 10 illustrates a third orthogonal multiplexing example representation 1000, according to examples of the invention. The third orthogonal multiplexing example representation 1000 also employs time multiplexing of access link and backhaul link random access resources. In this example, the same frequency is again used for both backhaul PRACH 1020 by the IAB node and access PRACH 1030, for example by the IAB node or UE node. As illustrated, in this example, the 'sharing' between access link random access resources 1030 and backhaul link random access resources 1020 may be limited to allocation of individual time slots for a particular use, such as slot i 1010 and slot i+2 1014 and slot i+4 1018 being allocated for access link random access resources 1030. In contrast, slot i+1 1012 and slot i+5 1019 are allocated for backhaul link random access resources 1020, as shown. Again, fewer backhaul link random access resources 1020 are allocated due to the less frequent need to support backhaul PRACH. However, as will be appreciated in the approach of FIG. 10, time domain multiplexing can be achieved with no disruption to access PRACH. However, additional resources are needed In some examples, it is envisaged that a combination of the first orthogonal multiplexing example approach and the second or third orthogonal multiplexing example approach may be employed, in order to achieve some balance between flexibility and resource efficiency.

Referring now to FIG. 11, a yet further representation 1100 is illustrated for orthogonal time multiplexing of access link and backhaul link random access resources with respect to the carrier bandwidth part (BWP), according to some examples of the invention. In this example, the separation of the PRACH is performed on a BWP basis. For example, this orthogonal time multiplexing of access link and backhaul link random access resources is particularly useful if the UE is only able to activate one BWP at a particular time, for example due to power consumption or complexity constraints. However, for IAB nodes these constraints can be removed. Hence, the IAB nodes can be allocated backhaul PRACH resources 1140 with fewer/no constraints. In this example, there is no need to activate the entire BWP, but the respective PRACH allocations for the IAB nodes can be configured in a first BWP 1140 compared to a second, different BWP 1150 from the UE active BWP PRACH allocations for access link random access resources 1130 as shown in FIG. 11.

In this example, the slots used for respective orthogonal time multiplexing of access link and backhaul link random access resources remain separate and distinguishable.

In some examples, it is envisaged that multiple RACH parameter sets may be allocated for orthogonal time and/or frequency multiplexing of access link and backhaul link random access resources time if access link and backhaul link PRACH are configured in the same BWP. However, since RACH parameters are configured per BWP, there is no need to have multiple RACH parameter sets with in the same BWP and therefore no need to expand system information in RRC since the network is able to configure one RACH parameter set for each BWP.

Referring now to FIG. 12, a simplified flowchart 1200 of a UE procedure is illustrated, in accordance with some example embodiments of the invention. The flowchart 1200 starts at 1202 with the UE reading broadcast system information blocks (SIBs). At 1204, the UE determines whether the SIB indicates multiple RACH configurations. If, at 1204, the UE determines that the SIB does not indicate multiple RACH configurations, a default RACH configuration is used at 1210 and the flowchart then jumps to 1208. If, at 1204, the UE determines that the SIB does indicate multiple RACH configurations, then the UE uses the first or default RACH configuration at 1206. Thereafter, at 1208, the UE performs a RACH operation using the first or default RACH configuration as and when needed.

Referring now to FIG. 13 a simplified flowchart 1300 of a first method for an IAB node (e.g. a 5G base station (gNB)) procedure is illustrated, in accordance with some example embodiments of the invention. The flowchart 1300 starts at 1302 with the IAB node reading broadcast system information blocks (SIBs). At 1304, the IAB node uses a default RACH configuration. At 1306, the IAB node determines whether multiple RACH configurations are used. If, at 1306, the IAB node determines that multiple RACH configurations are used, then it uses the RACH configuration for its IAB nodes. Thereafter, at 1308, the IAB node performs a RACH operation using the RACH configurations as and when needed. If, however, at 1306 the IAB node determines that multiple RACH configurations are not used, the flowchart jumps to 1308.

Referring now to FIG. 14, a simplified flowchart 1400 of a second method for an IAB node procedure is illustrated, in accordance with some example embodiments of the invention. The flowchart 1400 starts at 1402 with the IAB node reading broadcast system information blocks (SIBs). At 1404, the IAB node determines whether the SIB indicates multiple RACH configurations. If, at 1404, the IAB node determines that the SIB does not indicate multiple RACH configurations, a default RACH configuration is used at 1406 and the flowchart jumps to 1410. If, at 1404, the IAB node determines that the SIB does indicate multiple RACH configurations, then it uses the RACH configuration for its IAB nodes. Thereafter, at 1410, the IAB node performs a RACH operation using the RACH configurations as and when needed.

In particular, it is envisaged that the aforementioned inventive concept can be applied by a semiconductor manufacturer to any integrated circuit comprising a signal processor configured to perform any of the aforementioned operations. Furthermore, the inventive concept can be applied to any circuit that is able to configure, process, encode and/or decode signals for wireless distribution. It is further envisaged that, for example, a semiconductor manufacturer may employ the inventive concept in a design of a stand-alone device, such as a digital signal processor, or application-specific integrated circuit (ASIC) and/or any other sub-system element.

It will be appreciated that, for clarity purposes, the above description has described embodiments of the invention with reference to different functional units and processors. However, it will be apparent that any suitable distribution of functionality between different functional units or processors, for example with respect to the signal processor may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Thus, communication units such as gNBs functioning as IAB nodes and terminal devices such as UEs, a communication system and methods relating to RACH use for access and backhaul have been described, wherein the aforementioned disadvantages with prior art arrangements have been substantially alleviated.

In some examples, the aforementioned concepts may be implemented within the system information blocks (SIBs) on 3GPP™ standards. For example, after an initial cell synchronization process is completed, a UE will read the master information block. Then the UE can read SIB1 and SIB2 in order to obtain useful information related to cell access, SIB scheduling and radio resource configuration. SIB2 carries radio resource configuration information including Random Access CHannel (RACH) related parameters that are common for all UEs. In this regards, it is not possible that the IAB node is able to configure two different sets of RACH parameters to both the UE and one or more other IAB nodes, respectively, at the same time.

In order to be able to configure multiple sets of RACH parameters, the RACH configuration information elements (IEs) in RRC, such as RACH-ConfigCommon, RACH-ConfigGeneric, RACH-ConfigDedicated may be expanded in order to cover multiple parameter sets. A flag, e.g., RACH-IAB should be added to indicate that additional information elements (IEs) or parameters are defined for IAB RACH. In some examples of the invention, three ways are proposed in order to achieve this:

(i) define new RRC IEs;

(ii) add new parameters to configure different RACH settings; and (iii) expand the value range of the current parameters, taking different RACH configurations into account.

If the UE finds that the same resources are allocated to both access and backhaul, it can assume that access PRACH is punctured by backhaul PRACH. One example of this UE determination is illustrated below, where the new parameters are highlighted in italicised bold.

RACH-ConfigCommon information element
ASN1START
TAG-RACH-CONFIG-COMMON-START

```
RACH-ConfigCommon ::=         SEQUENCE {
rach-ConfigGeneric            RACH-ConfigGeneric,
rach-ConfigGenericIAB         RACH-ConfigGeneric,
totalNumberOfRA-Preambles     INTEGER (1..63)
      OPTIONAL,  -- Need S
ssb-perRACH-OccasionAndCB-PreamblesPerSSB
   CHOICE {
   oneEighth
   ENUMERATED
{n4,n8,n12,n16,n20,n24,n28,n32,n36,
n40,n44,n48,n52,n56,n60,n64},
```

```
    oneFourth
      ENUMERATED
 {n4,n8,n12,n16,n20,n24,n28,n32,n36,
 n40,n44,n48,n52,n56,n60,n64},
      oneHalf                         ENUMERATED
 {n4,n8,n12,n16,n20,n24,n28,n32,n36,
 n40,n44,n48,n52,n56,n60,n64},
      one                             ENUMERATED
 {n4,n8,n12,n16,n20,n24,n28,n32,n36,
 n40,n44,n48,n52,n56,n60,n64},
      two                             ENUMERATED
 {n4,n8,n12,n16,n20,n24,n28,n32},
      four                            INTEGER (1..16),
      eight                           INTEGER (1..8),
      sixteen                         INTEGER (1..4)
    }
 OPTIONAL, -- Need M
    groupBconfigured                  SEQUENCE {
    ra-Msg3SizeGroupA                 ENUMERATED
 { b56, b144, b208, b256, b282, b480, b640,
                                      b800, b1000,
 spare7, spare6,
 spare5, spare4, spare3, spare2, spare1},
      messagePowerOffsetGroupB
        ENUMERATED
 { minusinfinity, dB0, dB5, dB8,
 dB10, dB12, dB15, dB18},
    numberOfRA-PreamblesGroupA
      INTEGER (1..64)
    }
 OPTIONAL, -- Need R
    ra-ContentionResolutionTimer
      ENUMERATED { sf8, sf16, sf24,
 sf32, sf40, sf48, sf56, sf64},
      rsrp-ThresholdSSB               RSRP-Range
        OPTIONAL, -- Need R
      rsrp-ThresholdSSB-SUL           RSRP-Range
        OPTIONAL, -- Cond SUL
      prach-RootSequenceIndex
        CHOICE {
      l839                            INTEGER (0..837),
      l139                            INTEGER (0..137)
    },
      prach-RootSequenceIndexIAB
        CHOICE {
      l839                            INTEGER (0..837),
      l139                            INTEGER (0..137)
    },
    msg1-SubcarrierSpacing
      SubcarrierSpacing
    msg1-SubcarrierSpacingIAB
      SubcarrierSpacing
 OPTIONAL, --Need S
      restrictedSetConfig             ENUMERATED
 {unrestrictedSet, restrictedSetTypeA,
 restrictedSetTypeB},
    msg3-transformPrecoding
      ENUMERATED
 {enabled}
        OPTIONAL, -- Need R
      restrictedSetConfig1            ENUMERATED
 {unrestrictedSet, restrictedSetTypeA,
 restrictedSetTypeB},
    msg3-transformPrecodingIAB        ENUMERATED
 {enabled}
        OPTIONAL, -- Need R
    ...
    }
 -- TAG-RACH-CONFIG-COMMON-STOP
 -- ASN1STOP
 RACH-ConfigDedicated information element
 -- ASN1START
 -- TAG-RACH-CONFIG-DEDICATED-START
 -- FFS_Standlone: resources for
 msg1-based on-demand SI request
 RACH-ConfigDedicated ::=             SEQUENCE {
    cfra                              CFRA
        OPTIONAL, -- Need N
    ra-Prioritization                 RA-Prioritization
 OPTIONAL, -- Need N
    ...
 }
 CFRA ::=                             SEQUENCE {
    occasions                         SEQUENCE {
    rach-ConfigGeneric                RACH-ConfigGeneric,
    rach-ConfigGenericIAB             RACH-ConfigGeneric,
    ssb-perRACH-Occasion              ENUMERATED
 {oneEighth, oneFourth,
 oneHalf, one, two, four, eight, sixteen}
 OPTIONAL -- Cond SSB-CFRA
    ssb-perRACH-OccasionIAB           ENUMERATED
 {oneEighth, oneFourth, oneHalf,
 one, two, four, eight, sixteen}
        OPTIONAL -- Cond SSB-CFRA
 }
        OPTIONAL, -- Need S
    resources                         CHOICE {
      ssb                             SEQUENCE {
        ssb-ResourceList              SEQUENCE
 (SIZE(1..maxRA-SSB-Resources))
 OF CFRA-SSB-Resource,
        ra-ssb-OccasionMaskIndex      INTEGER (0..15)
        ra-ssb-OccasionMaskIndexIAB
 INTEGER (0..15)
      },
      csirs                           SEQUENCE {
        csirs-ResourceList            SEQUENCE
 (SIZE(1..maxRA-
 CSIRS-Resources)) OF CFRA-CSIRS-Resource,
        rsrp-ThresholdCSI-RS          RSRP-Range
      }
    },
    ...
 }
 CFRA-SSB-Resource ::=                SEQUENCE {
    ssb                               SSB-Index,
    ra-PreambleIndex                  INTEGER (0..63),
    ra-PreambleIndexIAB               INTEGER (0..63),
    ...
 }
 CFRA-CSIRS-Resource ::=              SEQUENCE {
    csi-RS                            CSI-RS-Index,
    ra-OccasionList                   SEQUENCE
 (SIZE(1..maxRA-OccasionsPerCSIRS))
 OF INTEGER (0..maxRA-Occasions-1),
    ra-OccasionList1                  SEQUENCE
 (SIZE(1..maxRA-OccasionsPerCSIRS))
 OF INTEGER (0..maxRA-Occasions-1),
    ra-PreambleIndex                  INTEGER (0..63),
    ra-PreambleIndexIAB               INTEGER (0..63),
    ...
 }
```

TAG-RACH-CONFIG-DEDICATED-STOP
ASN1STOP

In the above example, two RACH-ConfigGeneric IEs are configured. Alternatively, it is envisaged that only one RACH-ConfigGeneric IE may be configured as below. In some examples, the parameters related to power ramping may also be expanded, if needed, since IAB nodes can support higher transmission power (new range based on p1 and p2 can be defined), and thus larger ramping steps. In some examples, the second set of parameters are optional and can be configured in certain scenarios, e.g., IAB node random access is needed. In some examples, the RA response window can also be expanded to include larger values for IAB nodes and the emphasised (in bold and italicised) part is only an example:

RACH-ConfigGeneric information element
ASN1START
TAG-RACH-CONFIG-GENERIC-START
RACH-ConfigGeneric::=SEQUENCE {
prach-ConfigurationIndex INTEGER (0 . . . 255),
prach-ConfigurationIndexIAB INTEGER (0 . . . 255),

```
msg1-FDM ENUMERATED {one, two, four, eight},
msg1-FDMIAB ENUMERATED {one, two, four, eight}
    OPTIONAL,
msg1-FrequencyStart INTEGER (0 . . . maxNrofPhysi-
    calResourceBlocks-1),
msg1-FrequencyStart1 INTEGER (0 . . . maxNrofPhysi-
    calResourceBlocks-1) OPTIONAL,
zeroCorrelationZoneConfig INTEGER (0 . . . 15),
zeroCorrelationZoneConfigIAB INTEGER (0 . . . 15)
    OPTIONAL,
preambleReceivedTargetPower INTEGER (-202 . . .
    -60),
preambleReceivedTargetPowerIAB INTEGER (-p1 . . .
    -p2) OPTIONAL,
preambleTransMax ENUMERATED {n3, n4, n5, n6, n7,
    n8, n10, n20, n50, n100, n200, n400, n800, n1600},
powerRampingStep ENUMERATED {dB0, dB2, dB4,
    dB6, dB8, dB10},
ra-ResponseWindow ENUMERATED {sl1, sl2, sl4,
    sl8, sl10, sl20, sl40, sl80, s360, s720, s1440},
    . . .
}
TAG-RACH-CONFIG-GENERIC-STOP
ASN1STOP
```

In the prior art LTE system, PRS is always transmitted alone, since it is a high priority signal and it is not possible to multiplex it. Embodiments of the present invention permit and facilitate multiplexing of PRS with data and/or other reference signals.

If multiple PRS antenna ports are configured to one UE, these antenna ports should be orthogonal to each other to reduce interference and ensure hearability. In this application, hearability describes the ability of a signal to be detected. PRS multiplexing with data (e.g., URLLC data) can be addressed at two levels:

1) RB level where some of the RBs are allocated to PRS; and
2) subcarrier level within a RB where PRS can be multiplexed with data within the RBs allocated to PRS.

Dealing with option 1) first, in order to improve the hearability of the UE, it is possible that no data will be transmitted with PRS to reduce interference. This can be managed by gNB scheduling. In such a case, cell-specific and UE-specific PRS configurations make little difference because their signalling overhead will be similar. The PRS RBs can be placed in the middle, on the edge or some predefined position in the entire bandwidth.

However, 5G needs to support URLLC data, which requires extremely low latency and therefore may impose some constraints on gNB scheduling. There are two different approaches: 1) reservation-based scheduling, where URLLC resources are reserved prior to the data scheduling; and 2) instant scheduling, where any ongoing data transmission is interrupted to initiate the URLLC packet. The following alternatives can be considered for reservation-based scheduling.

1: The resources for URLLC or the subframes/slots/mini slots containing these resources should be avoided when configuring PRS, e.g., PRS periodicity including starting point and duration. The information of URLLC resources should be conveyed to and known by positioning protocols, e.g., LPP.
2: The resources for URLLC or the subframes/slots/mini slots containing these resources are scheduled without considering PRS and they will be punctured or shifted to the next available subframes/slots/mini slot to ensure no data is transmitted in the subframes/slots/mini slots containing URLLC resources if PRS is configured.

In this application, reference is made to frames/subframes/slots/mini slots. These are all temporal divisions and represent different periods of time.

Alternative 1 above can be applied to the case there the priority level of URLLC data is higher than the positioning request. However, since the positioning request can be triggered by an emergency, it could potentially have a high level of priority. In such a case, Alternative 2 can be used. These two alternatives can be combined to handle positioning requests with different levels of priority.

For instant scheduling, the ongoing PRS transmission could be interrupted by a URLLC packet and the following solutions should be considered:

1: The ongoing PRS transmission is stopped in the subframes/slots/mini slots where URLLC packets are initiated and this is signaled to the UE by DCI;
2: The URLLC packets are punctured or initiated from the first subframes/slots/mini slots after the latest PRS transmission.

Alternative 1 above can be applied to the case there the priority level of URLLC data is higher than positioning request and Alternative 2 can be used otherwise.

Considering the wider bandwidth supported in NR, it would be a huge waste not to transmit any data in the subframes/slots/mini slots including PRS. In such a case, PRS can be configured in a sub-band and the rest of the parts can be used for data transmission. The following alternatives can be considered:

1: PRS RBs are around the middle with guard bands on the two sides as shown in FIG. 1(a). In such a case, the number of guard bands can be either pre-defined or configured by upper layers;
2: PRS RBs are on the two edges with guard bands as shown in FIG. 1 (b). In such a case, it can benefit from frequency diversity gain;
3: PRS RBs are on one edge as shown in FIG. 1 (c). In such a case, only one guard band is needed and capacity loss is reduced.

The above three alternatives can be combined and which to use can be configured by upper layers.

Note that in FIG. 15, time is on the x axis and frequency is on the y axis, so that each of FIGS. 15(a), (b) and (c) independently represents a simultaneous transmission. The use of guard bands is to ensure proper separation (in frequency) of PRS and the simultaneously transmitted data.

In order to improve the hearability of the UE, PRS should not be multiplexed with data on RE level within one RB.

It is possible to multiplex PRS with other reference signals. DMRS and PTRS are only used for data demodulation purpose. If no data is transmitted when PRS is transmitted, there is no need to consider multiplexing of PRS and DMRS/PTRS. If data can be transmitted, the following alternatives may be considered:

1: PRS pattern is designed to avoid the symbols where DMRS could potentially be configured as shown in FIG. 16a. For additional DMRS and PTRS, PRS can be punctured. In this context, PRS is punctured where it would otherwise coincide with PTRS or DMRS;
2: DMRS/PTRS is punctured/shifted by one or multiple REs or symbols when colliding with PRS to ensure the reception of PRS;
3: PRS is shifted by one or multiple REs or symbols when colliding with DMRS/PTRS This is shown in FIG. 16b where PRS which would otherwise be punctured (as in FIG. 16a) is shifted to a neighbouring (or possibly other) RE so that the frequency of PRS transmission is maintained.

In FIGS. 16a and 16b, the x-axis represents OFDM symbol index (k=0-13) and the y axis represents sub-carrier (l=0-11). In FIGS. 16a and 16b, control information is usually included in the first 3 symbols (k=0-2) and so these are not available.

It is further possible to multiplex PRS with CSI-RS. CSI-RS is used to acquire channel state information (CSI) and CSI might be needed even when there is no data transmission. Two alternatives can be considered as follows.

1: CSI-RS is punctured/shifted by one or multiple REs or symbols when colliding with PRS;
2: PRS is punctured/shifted by one or multiple REs or symbols when colliding with CSI-RS.

For Alternative 1, the positioning request has higher priority level than CSI acquisition and otherwise for Alternative 2. CSI-RS puncture can also depend on the type of CSI-RS. For example, periodic CSI-RS can be punctured when colliding with PRS but for aperiodic CSI-RS, PRS will be punctured instead.

In LTE, both PSS/SSS/PBCH and PRS are configured around the center of the frequency so that PRS is not configured in the subframe with PSS/SSS/PBCH, which can be achieved by configuring the offset of the PRS subframes. However, in NR, PSS/SSS/PBCH is not necessarily located around the centre of the frequency. Therefore, PRS could be multiplexed with PSS/SSS/PBCH in the frequency domain as shown in FIG. 17 and the following alternatives are possible:

1: A pre-defined offset between PSS/SSS/PBCH and PRS;
2: An offset between PSS/SSS/PBCH and PRS which can be explicitly configured by upper layer, e.g., LPP/RRC;
3: The offset can be implicitly derived from cell-specific parameters, e.g., cell ID, and/or UE specific parameters, e.g., RNTI.

The offset has the effect that PRS and PSS/SSS/PBCH are transmitted simultaneously but one of the signals is shifted in frequency to avoid collision.

Once data or other reference signals are blanked/punctured, the power can be used to boost the power of PRS to improve hearability. If there is only one PRS antenna port, all the power can be allocated to this antenna port. However, if more than one antenna port is configured for PRS transmission, the power may be split between these antenna ports. The power boosting ratio can be defined as energy per resource element (EPRE) ratio to SSB and can be pre-defined, configured by an upper layer, or implicitly derived from blanked/punctured REs.

FIG. 18 is a block diagram illustrating the structure of a user equipment according to another embodiment of the present disclosure.

The processor 1810 may include one or more processors or other processing devices that control the proposed function, process, and/or method. Operation of the user equipment 1800 may be implemented by the processor 1810.

The processor 1810 may random access in an integrated access and backhaul communication system. The processor 1810 may read broadcast system information blocks, determine whether the SIB indicates multiple RACH configurations. As the result of the determination, the processor 1810 may use the first or default RACH configuration, or use the default RACH configuration. Also, the processor 1810 may perform RACH when needed.

The transceiver 1820 may include a RF transmitter for up-converting and amplifying a transmitted signal, and a RF receiver for down-converting a frequency of a received signal. However, according to another embodiment, the transceiver 1820 may be implemented by more or less components than those illustrated in components.

The transceiver 1820 may be connected to the processor 1810 and transmit and/or receive a signal. The signal may include control information and data. In addition, the transceiver 1820 may receive the signal through a wireless channel and output the signal to the processor 1810. The transceiver 1820 may transmit a signal output from the processor 1810 through the wireless channel.

The memory 1830 may store the control information or the data included in a signal obtained by the device 1800. The memory 1830 may be connected to the processor 1810 and store at least one instruction or a protocol or a parameter for the proposed function, process, and/or method. The memory 1830 may include read-only memory (ROM) and/or random access memory (RAM) and/or hard disk and/or CD-ROM and/or DVD and/or other storage devices.

FIG. 19 is a block diagram illustrating the structure of a base station according to another embodiment of the present disclosure.

Referring to the FIG. 19, the base station 1900 may include a processor 1910, a transceiver 1920 and a memory 1930. However, all of the illustrated components are not essential. The device 1900 may be implemented by more or less components than those illustrated in FIG. 19. In addition, the processor 1910 and the transceiver 1920 and the memory 1930 may be implemented as a single chip according to another embodiment.

The aforementioned components will now be described in detail.

The processor 1910 may include one or more processors or other processing devices that control the proposed function, process, and/or method. Operation of the device 1900 may be implemented by the processor 1910.

The transceiver 1920 may include a RF transmitter for up-converting and amplifying a transmitted signal, and a RF receiver for down-converting a frequency of a received signal. However, according to another embodiment, the transceiver 1920 may be implemented by more or less components than those illustrated in components.

The transceiver 1920 may be connected to the processor 1910 and transmit and/or receive a signal. The signal may include control information and data. In addition, the transceiver 1920 may receive the signal through a wireless channel and output the signal to the processor 1910. The transceiver 1920 may transmit a signal output from the processor 1910 through the wireless channel.

The memory 1930 may store the control information or the data included in a signal obtained by the device 1900. The memory 1930 may be connected to the processor 1910 and store at least one instruction or a protocol or a parameter for the proposed function, process, and/or method. The memory 1930 may include read-only memory (ROM) and/or random access memory (RAM) and/or hard disk and/or CD-ROM and/or DVD and/or other storage devices.

The invention claimed is:

1. A method, performed by an integrated access and backhaul (IAB) node in a wireless communication system, the method comprising:
identifying backhaul random access channel (RACH) resources, and
transmitting a signal based on the backhaul RACH resources,
wherein the backhaul RACH resources are configured with at least one of different time or frequency configurations, different RACH periodicities, or different preamble formats compared to access RACH resources, wherein the access RACH resources include first times slots designated for a first specific use and the backhaul RACH resources include second times slots designated for a second specific use, wherein, if the access RACH resources and the backhaul RACH resources are configured in a same bandwidth part (BWP), based on RACH parameters being configured per BWP, one RACH parameter set shared between the access RACH resources and the backhaul RACH resources is configured for the same BWP, and wherein time configurations of the access RACH resources are configured with no disruption to the time configurations of the backhaul RACH resources.

2. The method of claim 1,
wherein RACH periodicities of the backhaul RACH resources are long compared to RACH periodicities of the access RACH resources.

3. The method of claim 1,
wherein time configurations of the backhaul RACH resources are associated with time division multiplex (TDM).

4. The method of claim 1,
wherein preamble formats of the backhaul RACH resources are used for longer distance compared to preamble formats of the access RACH resources.

5. An integrated access and backhaul (IAB) node in a wireless communication system, the IAB node comprising:
a transceiver; and
at least one processor connected with the transceiver and configured to:
identify backhaul random access channel (RACH) resources, and
transmit a signal based on the backhaul RACH resources,
wherein the backhaul RACH resources are configured with at least one of different time or frequency configurations, different RACH periodicities, or different preamble formats compared to access RACH resources,
wherein the access RACH resources include first times slots designated for a first specific use and the backhaul RACH resources include second times slots designated for a second specific use,
wherein, if the access RACH resources and the backhaul RACH resources are configured in a same bandwidth part (BWP), based on RACH parameters being configured per BWP, one RACH parameter set shared between the access RACH resources and the backhaul RACH resources is configured for the same BWP, and
wherein time configurations of the access RACH resources are configured with no disruption to the time configurations of the backhaul resources.

6. The IAB node of claim 5,
wherein RACH periodicities of the backhaul RACH resources are long compared to RACH periodicities of the access RACH resources.

7. The IAB node of claim 5,
wherein time configurations of the backhaul RACH resources are associated with time division multiplex (TDM).

8. The IAB node of claim 5,
wherein preamble formats of the backhaul RACH resources are used for longer distance compared to preamble formats of the access RACH resources.

9. A method, performed by a user equipment (LE) in a wireless communication system, the method comprising:
identifying access random access channel (RACH) resources; and
transmitting a signal based on the access RACH resources,
wherein the access RACH resources are configured with at least one of different time or frequency configurations, different RACH periodicities, or different preamble formats compared to backhaul RACH resources associated with at least one integrated access and backhaul GAB) node,
wherein the access RACH resources include first times slots designated for a first specific use and the backhaul RACH resources include second times slots designated for a second specific use,
wherein, if the access RACH resources and the backhaul RACH resources are configured in a same bandwidth part (BWP), based on RACH parameters being configured per BWP, one RACH parameter set shared between the access RACH resources and the backhaul RACH resources is configured for the same BWP, and
wherein time configurations of the access RACH resources are configured with no disruption to the time configurations of the backhaul resources.

10. The method of claim 9,
wherein RACH periodicities of the backhaul RACH resources are long compared to RACH periodicities of the access RACH resources.

11. The method of claim 9,
wherein time configurations of the backhaul RACH resources are associated with time division multiplex (TDM).

12. The method of claim 9,
wherein preamble formats of the backhaul RACH resources are used for longer distance compared to preamble formats of the access RACH resources.

13. A user equipment (UE) in a wireless communication system, the UE comprising:
a transceiver; and
at least one processor connected with the transceiver and configured to:
identify access random access channel (RACH) resources, and
transmit a signal based on the access RACH resources,
wherein the access RACH resources are configured with at least one of different time or frequency configurations, different RACH periodicities, or different preamble formats compared to backhaul RACH resources,
wherein the access RACH resources include first times slots designated for a first specific use and the backhaul RACH resources include second times slots designated for a second specific use,
wherein, if the access RACH resources and the backhaul RACH resources are configured in a same bandwidth part (BWP), based on RACH parameters being configured per MVP, one RACH parameter set shared between the access RACH resources and the backhaul RACH resources is configured for the same MVP, and
wherein time configurations of the access RACH resources are configured with no disruption to the time configurations of the backhaul resources.

14. The UE of claim 13,
wherein RACH periodicities of the backhaul RACH resources are long compared to RACH periodicities of the access RACH resources.

15. The UE of claim 13,
wherein time configurations of the backhaul RACH resources are associated with time division multiplex (TDM).

* * * * *

UNITED STATES PATENT AND TRADEMARK OFFICE
CERTIFICATE OF CORRECTION

PATENT NO. : 11,743,949 B2
APPLICATION NO. : 17/264068
DATED : August 29, 2023
INVENTOR(S) : Yinan Qi et al.

Page 1 of 1

It is certified that error appears in the above-identified patent and that said Letters Patent is hereby corrected as shown below:

In the Claims

In Column 26, Line 1, in Claim 9:
"A method, performed by a user equipment (LE) in a"
Should be:
--A method, performed by a use equipment (UE) in a--

In Column 26, Line 12, Claim 9:
"backhaul GAB) node,"
Should be:
--backhaul (IAB) node,--

In Column 26, Line 57, Claim 13:
"ured per MVP, one RACH parameter set shared"
Should be:
--ured per BWP, one RACH parameter set shared--

In Column 26, Line 59, Claim 13:
"RACH resources is configured for the same MVP, and"
Should be:
--RACH resources is configured for the same BWP, and--

Signed and Sealed this
Fourth Day of March, 2025

Coke Morgan Stewart
*Acting Director of the United States Patent and Trademark Office*